(12) United States Patent
Tatsuda

(10) Patent No.: US 10,029,491 B2
(45) Date of Patent: Jul. 24, 2018

(54) MEASURING DEVICE AND PRINTING APPARATUS

(71) Applicant: Seiko Epson Corporation, Tokyo (JP)

(72) Inventor: Tetsuo Tatsuda, Ina (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/465,987

(22) Filed: Mar. 22, 2017

(65) Prior Publication Data

US 2017/0334220 A1  Nov. 23, 2017

(30) Foreign Application Priority Data

May 20, 2016 (JP) ................................. 2016-101359

(51) Int. Cl.
- *B41J 2/175* (2006.01)
- *B41J 13/00* (2006.01)
- *G01J 3/02* (2006.01)

(52) U.S. Cl.
CPC ......... *B41J 13/0009* (2013.01); *G01J 3/0232* (2013.01); *G01J 3/0291* (2013.01); *G01J 3/0297* (2013.01)

(58) Field of Classification Search
CPC .... B41J 13/0009; G01J 3/0232; G01J 3/0291; G01J 3/0297

USPC .......................................................... 347/16
See application file for complete search history.

(56) References Cited

U.S. PATENT DOCUMENTS

| | | | |
|---|---|---|---|
| 5,880,852 A * | 3/1999 | Asano ................ | H04N 1/00278 347/3 |
| 5,903,401 A | 5/1999 | Tanaka et al. | |
| 2007/0194515 A1 * | 8/2007 | Kozaki ................ | B65H 3/0669 271/126 |

FOREIGN PATENT DOCUMENTS

| | | |
|---|---|---|
| JP | H09-191357 A | 7/1997 |
| JP | 2012-020423 A | 2/2012 |

* cited by examiner

*Primary Examiner* — Huan Tran
*Assistant Examiner* — Alexander D Shenderov
(74) *Attorney, Agent, or Firm* — Harness, Dickey & Pierce, P.L.C.

(57) ABSTRACT

A measuring device includes an optical device which includes a window on which light is incident, a shutter which includes a white reference surface on an optical device side and is configured to block the window, a first moving mechanism which moves the optical device in a direction, and a second moving mechanism which relatively moves the window and the shutter between a first position at which the window is blocked by the white reference surface and a second position at which light is incident on the window.

19 Claims, 15 Drawing Sheets

MEASURING DEVICE AND PRINTING APPARATUS

BACKGROUND

1. Technical Field

The present invention relates to a measuring device, a printing apparatus, and the like.

2. Related Art

In the related art, a printer (printing apparatus) which ejects ink droplets from an ink jet recording head and forms an image onto a medium is known. In such a printing apparatus, there is a risk that ink mist that occurs when ink droplets are ejected becomes attached to an optical device, such as an imaging camera or a spectrometer, and reduces the functionality of the optical device. In response, a configuration for suppressing the attachment of the ink mist is known (for example, JP-A-2012-20423).

The printing apparatus described in JP-A-2012-20423 includes a light irradiating portion which ejects ink droplets from an ink jet recording head and cures the ink droplets that have been deposited onto a medium by using light irradiated from the light irradiating portion. The light irradiating portion includes a rotatable columnar lens that is rotated to generate air flow to thereby suppress the attachment of the ink mist.

However, in the apparatus described in JP-A-2012-20423, the lens is rotated and thus the optical characteristics of the lens are reduced. Accordingly, when the configuration described above is applied to an optical device, such as an imaging camera or a spectrometer, which performs processing based on incident light, the incident light is distorted by the rotation of the lens, an image is not captured with high accuracy, or accuracy of spectrometry is reduced. That is, measurement accuracy reduced by the optical device is a problem to be solved.

Furthermore, a white reference surface for correcting the result of spectrometry and the captured image obtained by the optical device may be provided inside the printing apparatus. In this case, problems to be solved are that it is difficult to suppress the ink mist from attaching to the white reference surface, and calibration accuracy, that is, measurement accuracy by the optical device is reduced.

SUMMARY

An advantage of some aspects of the invention is to provide, in a simple configuration, a measuring device and a printing apparatus capable of suppressing a reduction in measurement accuracy caused by the optical device.

A measuring device according to an application example of the invention includes an optical device which includes a window on which light is incident, a shutter which includes a white reference surface on an optical-device side and is configured to block the window, a first moving mechanism which moves the optical device in a direction, and a second moving mechanism which relatively moves the window and the shutter between a first position at which the window is blocked by the white reference surface and a second position at which light may be incident on the window in accordance with movement of the optical device by the first moving mechanism.

In the application example, the optical device and the shutter including the white reference surface are disposed within a casing. The shutter is moved relatively with respect to the window in accordance with the movement of the optical device by the first moving mechanism, and the white reference surface is opposed to the window. That is, the shutter is moved between the first position at which the window is blocked by the shutter and the second position at which light may be incident on the window.

In the measuring device, the optical device is moved by using the first moving mechanism such that a position at which incident light is exposed onto the optical device, that is, a measurement position is changeable. In accordance with the movement of the optical device by the first moving mechanism, in a situation where the optical device is enabled to measure incident light, the shutter may be moved relatively to the second position, and in a situation where the measurement by the optical device is not enabled, the shutter may be moved relatively to the first position. A relative position of the shutter is set to the first position to thereby make it possible to suppress the functionality of the optical device from being reduced and to suppress contamination of the white reference surface due to contamination by, for example, ink mist.

From the matters described above, according to the application example, by using a simple configuration, it is possible to suppress the functionality of measurement accuracy by the optical device from being reduced.

In the measuring device of the application example, a plurality of optical devices are preferably included, the shutter preferably includes white reference surfaces which respectively correspond to a plurality of optical devices, the second moving mechanism is preferably able to simultaneously change relative positions of the plurality of the white reference surfaces and the optical devices corresponding thereto between the first position and the second position.

In the application example, the shutter includes the white reference surfaces corresponding to a plurality of the optical devices. The second moving mechanism simultaneously changes positions of the shutter with respect to a plurality of the optical devices in accordance with the movement of the optical device by the first moving mechanism between the first position and the second position. According to the configuration described above, it is possible to simplify a configuration of the measuring device compared with a case where the relative positions of respective optical devices and the shutter are individually changed. Accordingly, even in a situation where a plurality of optical devices are included, by using a simple configuration, it is possible to suppress measurement accuracy by respective optical devices from being reduced.

In the measuring device of the application example, in a situation where the relative position of the shutter is the second position, it is preferable that a cover member covering the white reference surface be included.

In the application example, in a situation where the relative position of the shutter is the second position, the cover member covering the white reference surface is included. According to the configuration described above, the white reference surface is disposed to be opposed to the window at the first position and is covered by the cover member at the second position. Accordingly, it is possible to suppress the ink mist from attaching to the white reference surface.

In the measuring device of the application example, a casing, in which the optical device is provided and which includes an opening portion at a position opposing the window, is preferably included, the shutter is preferably disposed within the casing, and the first moving mechanism preferably moves the optical device by moving the casing.

In the application example, the shutter including the optical device and the white reference surface is disposed in the casing. In a case where the shutter is set to the first position, the shutter blocks the window and the opening portion. According to the configuration described above, it is possible to more reliably suppress performance of the optical device from being reduced and to suppress contamination of the white reference surface due to ink mist. Accordingly, it is possible to suppress measurement accuracy of the white reference surface by the optical device from being reduced and to suppress calibration accuracy of white calibration from being reduced.

In the measuring device of the application example, the second moving mechanism preferably includes a protruding portion which is connected to the shutter and protrudes beyond the casing and an abutting portion onto which the protruding portion abuts in accordance with the movement of the casing by the first moving mechanism and the shutter is preferably moved relatively when the first moving mechanism moves the casing while enabling the protruding portion to abut the abutting portion.

In the application example, the second moving mechanism includes the protruding portion connected to the shutter and the abutting portion onto which the protruding portion abuts. The casing is moved by using the first moving mechanism while enabling the protruding portion to abut the abutting portion such that relative positions of the window, the opening portion, and the shutter are changed. In the configuration described above, the casing is moved by driving the first moving mechanism to thereby make it possible to change the relative position of the shutter. Accordingly, a device such as an actuator or a motor for moving the shutter does not need to be separately provided and it is possible to further simplify the configuration.

In the measuring device of the application example, the second moving mechanism preferably includes the protruding portion connected to the shutter and protrudes beyond the casing, the abutting portion onto which the protruding portion abuts in accordance with the movement of the casing by the first moving mechanism, an urging portion which urges the shutter in the one direction, and a latch portion which fixes the position of the shutter, and when the casing is moved by using the first moving mechanism and the protruding portion abuts the abutting portion, fixing the position of the shutter by the latch portion or releasing the fixing is preferably performed, and the shutter is preferably moved relatively between the first position and the second position.

Here, the latch portion is configured to be able to fix the position of the shutter against an urging force of an urging member. In the application example, when the protruding portion connected to the shutter abuts the abutting portion, the position of the shutter by the latch portion is fixed or released.

In the configuration described above, the casing is moved in one direction or in another direction opposite to the one direction to thereby make it possible to change the positional relationship between the shutter and the window. Accordingly, a fixed state in which a position of a slider is fixed is made to correspond to one of an exposed state and a blocked state, and a fixing released state in which the fixed state is released is made to correspond to the other of the exposed state and the blocked state to thereby make it possible to switch between the exposed state and the blocked state by moving the casing in the one direction.

In the measuring device of the application example, the protruding portion preferably protrudes from the casing in the one direction.

In the application example, the protruding portion protrudes from the casing in the one direction. In the configuration described above, it is possible to dispose the abutting portion outside of a moving range of the casing by using the first moving mechanism. Accordingly, it is possible to suppress the abutting portion and the casing from interfering with each other when the casing is moved by using the first moving mechanism and to suppress the reduction in reliability of the measuring device due to the interference between the casing and the abutting portion.

In the application example, the measuring device preferably further includes a movement control unit which moves the optical device by using the first moving mechanism to change the relative positions of the window and the shutter between the first position and the second position and a measurement control unit which causes the optical device to perform main measurement by which measurement of a measurement target is performed, and the movement control unit preferably changes the relative position to the second position when the main measurement is performed and preferably changes the relative position to the first position except when the main measurement is performed.

In the application example, when the main measurement is performed, the relative position of the shutter is set to the second position to thereby make it possible to set a state in which light may pass through the optical device. Except when the main measurement is performed (for example, during measurement standby or during measurement of the white reference surface), the relative position of the shutter is set to the first position to thereby block the window by closing the shutter. With this, the window of the optical device is exposed only when the main measurement is performed; otherwise, the window of the optical device is blocked. Thus, it is possible to more reliably suppress contaminants from attaching to the optical device.

A printing apparatus according to another application example of the invention includes the measuring device of the application example and a printing unit which prints an image onto a medium.

In the application example, it is possible to use the optical device to measure (for example, image-capturing in a situation where the optical device is an imaging apparatus) the image printed by the printing unit. Accordingly, it is possible to change a driving condition of the printing apparatus or the like based on a measurement result.

In the application example, in a situation where the optical device is enabled to measure incident light, the shutter may be moved relatively to the second position, and in a situation where the measurement by the optical device is not enabled, the shutter may be moved relatively to the first position, in accordance with the movement of the optical device by using the first moving mechanism. As such, the relative position of the shutter is set to the first position to thereby make it possible to suppress the functionality of the optical device from being reduced and to suppress contamination of the white reference surface due to ink mist.

From the matters described above, according to the application example, by using a simple configuration, it is possible to suppress measurement accuracy by the optical device from being reduced.

In the printing apparatus of the application example, a maintenance portion which conducts maintenance of the printing unit when the optical device is moved to a maintenance position is preferably further included, and the second moving mechanism preferably changes the relative positions of the window and the shutter to the first position when the optical device is moved to the maintenance position by using the first moving mechanism.

In the application example, the relative position of the shutter is changed to the first position when the optical device is moved to the maintenance position by the maintenance portion. In the configuration described above, maintenance of the printing unit is conducted when the window is blocked by the shutter and thus, it is possible to suppress the functionality from being reduced or to suppress contamination of the white reference surface due to performance of maintenance of the printing apparatus.

In the printing apparatus of the application example, a movement control unit which moves the optical device by using the first moving mechanism to change the relative positions of the window and the shutter between the first position and the second position and a printing control unit which causes the printing unit to print the image are preferably further included, and the printing control unit preferably causes the printing unit to print the image after the relative position is changed to the first position by the movement control unit.

In the application example, printing of an image by the printing unit is performed after the relative position of the shutter is changed to the first position by the movement control unit. In the configuration described above, when the image is printed by the printing unit, the window may be blocked by the shutter. Accordingly, even in a situation where ink mist is generated during printing, it is possible to suppress the functionality of the optical device from being reduced and to suppress contamination of the white reference surface due to the ink mist.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
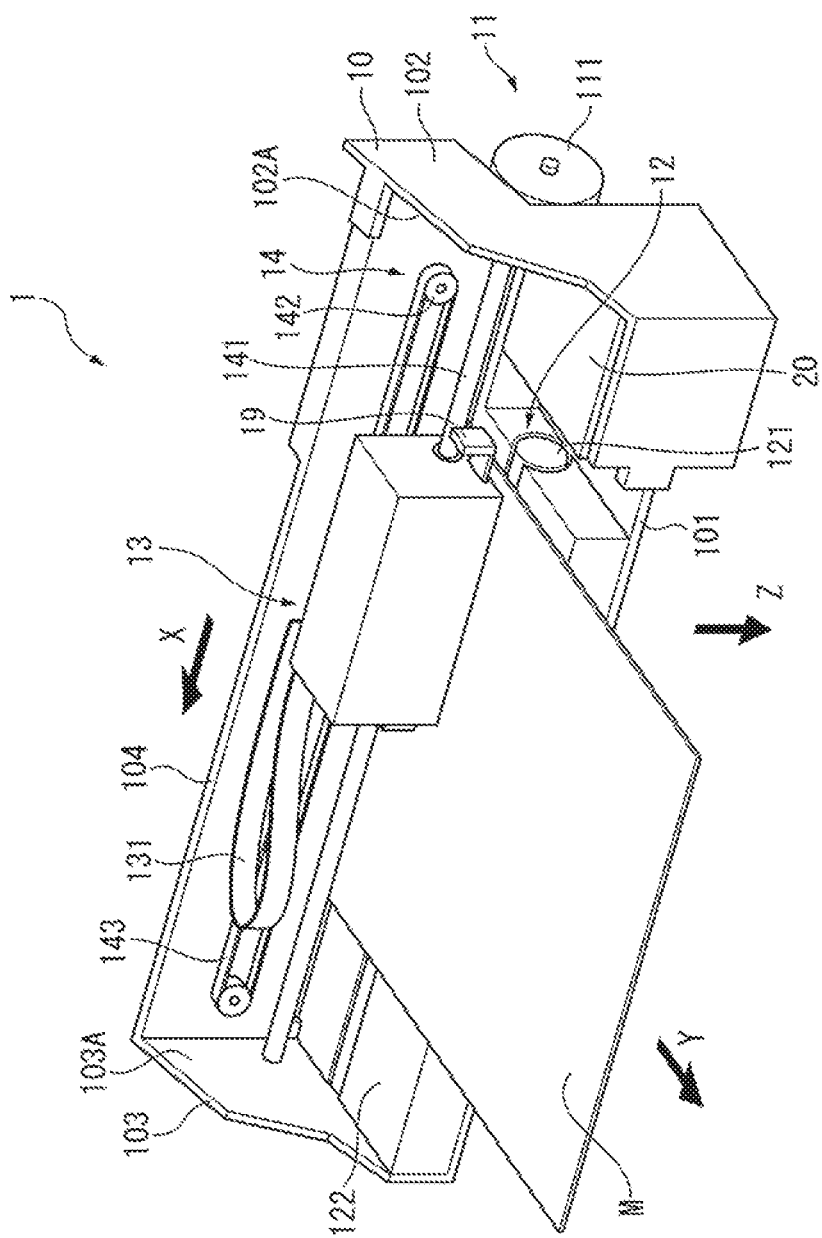
FIG. 1 is a line drawing illustrating a schematic configuration of a printer of a first embodiment.
Figure 2:
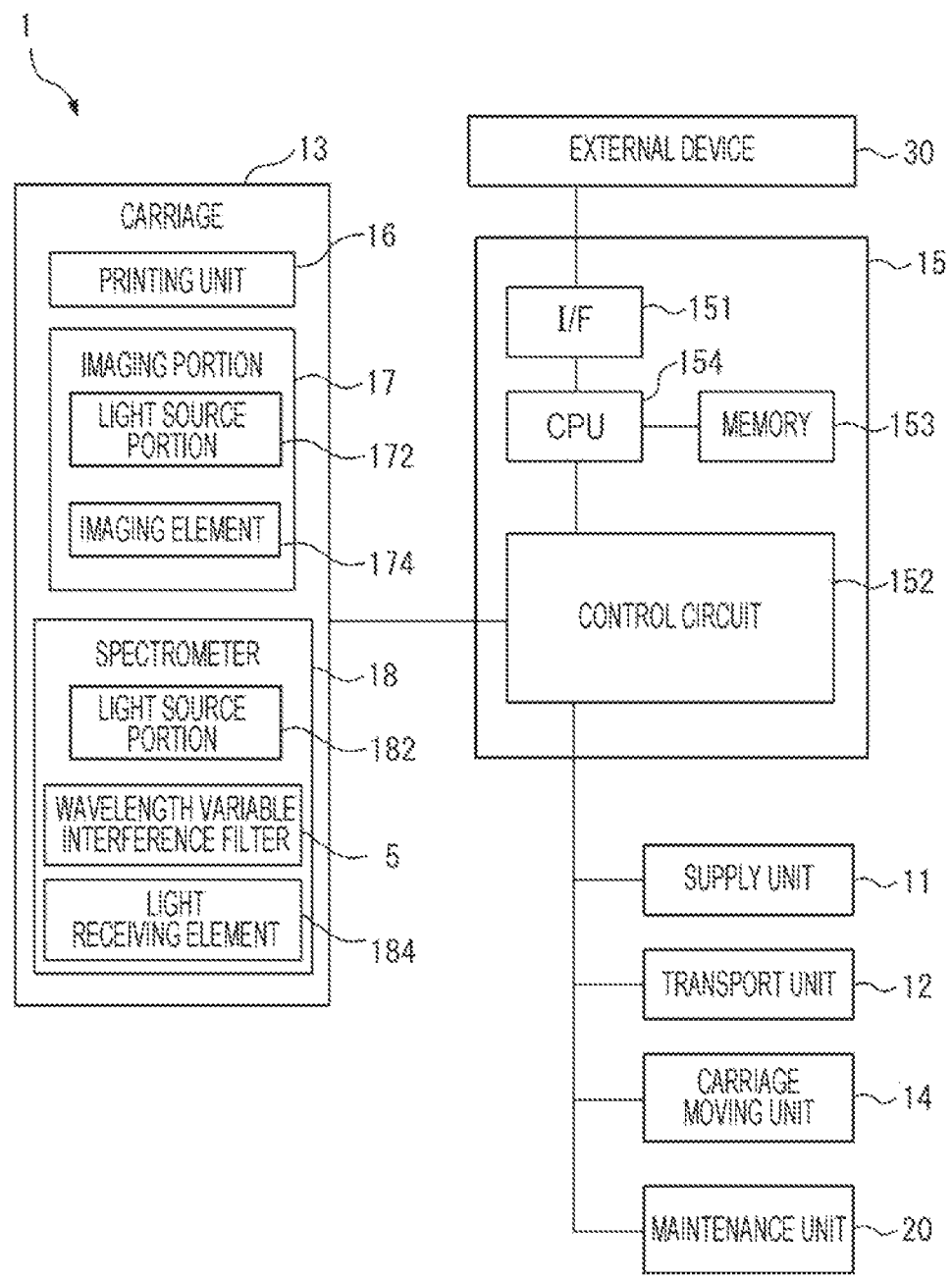
FIG. 2 is a block diagram illustrating the schematic configuration of the printer of the first embodiment.
Figure 3:
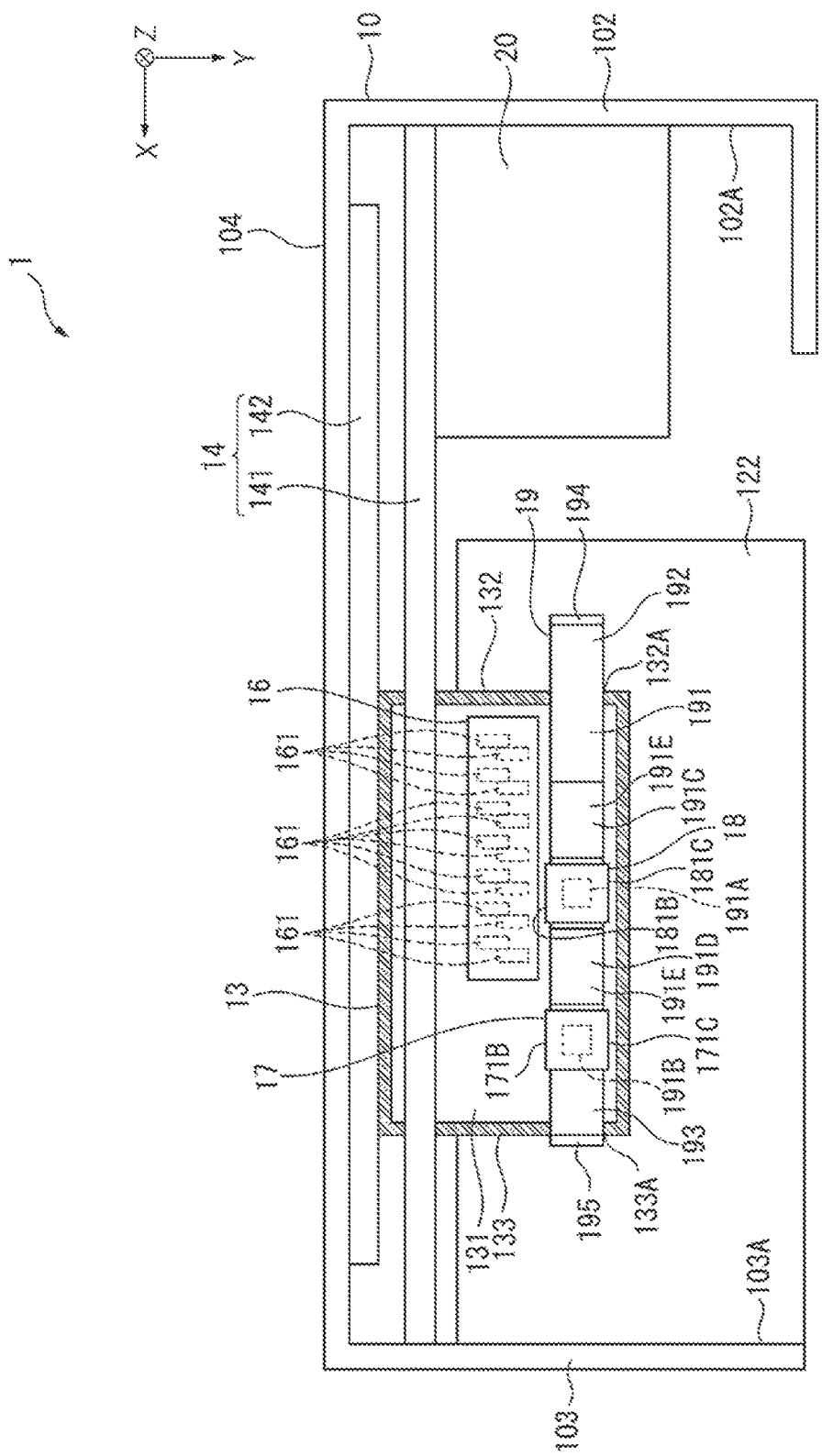
FIG. 3 is a plan view schematically illustrating a configuration of main portions of the printer of the first embodiment.

The first embodiment according to the invention will be described in accordance with the accompanying drawings. In the first embodiment, a printer 1 (ink jet printer) as an example of a printing apparatus provided with a measuring device of the invention will be described.
Schematic Configuration of Printer FIG. 1 is a perspective view illustrating an example of the appearance and configuration of the printer 1 of a first embodiment. FIG. 2 is a block diagram illustrating a schematic configuration of the printer 1 of the first embodiment. FIG. 3 is a diagram illustrating the schematic configuration of the printer 1 of the first embodiment.

As illustrated in FIG. 1, the printer 1 corresponds to a printing apparatus of the invention and includes a unit casing 10, a supply unit 11, a transport unit 12, a carriage 13, a carriage moving unit 14 corresponding to a moving mechanism of the invention, a control unit 15 (see FIG. 2), and a maintenance unit 20 corresponding to a maintenance portion of the invention. In the carriage 13, as illustrated in FIG. 3, a printing unit 16, an imaging portion 17, and a spectrometer 18 corresponding to an optical device of the invention, and a shutter mechanism 19 for protecting an imaging portion 17 and a spectrometer 18 against contaminants such as ink mist are provided. The shutter mechanism 19 is driven in accordance with the movement of the carriage 13 by the carriage moving unit 14. In the first embodiment, a configuration in which the carriage 13 on which the imaging portion 17, the spectrometer 18, and the shutter mechanism 19 are mounted and the carriage moving unit 14 are included is exemplified as a measuring device.

The printer 1 configured as described above controls respective units 11, 12, and 14 and the carriage 13 and prints an image onto a medium M based on printing data input from an external device 30, such as a personal computer. For example, a correction pattern for correcting density unevenness is used as the image such that the printer 1 is able to capture an image of the correction pattern by using the imaging portion 17 and perform density unevenness correction (banding correction) based on data for image capturing.

Next, respective configurations of the printer 1 will be described in detail.

Respective units 11, 12, 14, 15, and 20 and the carriage 13 are provided in the unit casing 10. The unit casing 10 is located on the +Z side and includes a bottom surface portion 101 in which the transport unit 12, the maintenance unit 20 and the like are disposed, and a first side surface portion 102, a second side surface portion 103, and a third side surface portion 104 that are connected to the bottom surface portion 101 and oriented in the −Z-direction. The first side surface portion 102 is located on the −X side, the second side surface portion 103 is located on the +X side, the third side surface portion 104 is located between the first side surface portion 102 and the second side surface portion 103 in the X-direction.

Here, an inner surface 102A of the first side surface portion 102 is a surface on which a first end portion 194 of the shutter mechanism 19, which will be described later, abuts and an inner surface 103A of the second side surface portion 103 is a surface on which a second end portion 195 of the shutter mechanism 19, which will be described later, abuts. The inner surfaces 102A and 103A regulate the movement of a shutter 191 in the X-direction.

Although not illustrated, the printer 1 includes an exterior casing which covers at least a portion of the unit casing 10.

The supply unit 11 is a unit to supply the medium M (in the first embodiment, a paper sheet is illustrated), which becomes an image formation target, to an image formation position. The supply unit 11 includes, for example, a roll body 111 (see FIG. 1) around which the medium M is wound, a roll driving motor (not illustrated), and roll driving wheel rows (not illustrated). The roll driving motor rotates in accordance with the instruction from the control unit 15, and a rotational force of the roll driving motor is transferred to a roll body 111 through the roll driving wheel rows. With this, the roll body 111 rotates, and the paper sheet wound around the roll body 111 is supplied downstream (on the +Y side) in the +Y-direction (sub-scanning direction).

In the first embodiment, an example is provided in which the paper sheet wound around the roll body 111 is supplied, but the first embodiment is not limited thereto. For example, the medium M may be supplied by any supplying method, for example, a method of supplying the medium M such as paper sheets stacked in a tray or the like, one by one by a roller or the like.

The transport unit 12 transports the medium M supplied from the supply unit 11 in the Y-direction. The transport unit 12 is configured to include a transport roller 121, a driven roller (not illustrated) that is disposed so that the medium M is interposed between itself and the transport roller 121 and that is driven by the transport roller 121, and a platen 122.

A driving force is transferred to the transport roller 121 from the transport motor (not illustrated) and when the transport motor is driven by control of the control unit 15, the transport roller 121 rotates in response to the rotational force and transports the medium M in the Y-direction while interposing the medium A between the driven roller and the transport roller 121. The platen 122 opposing the carriage 13 is provided downstream (on the +Y side) of the transport roller 121 in the Y-direction.

The carriage 13 is a casing on which the printing unit 16, which ejects inks onto the medium M and prints an image, the imaging portion 17, which captures the image on the medium M, the spectrometer 18, which performs spectrometry for the correction pattern for a color measurement position on the medium M, and the shutter mechanism 19 are mounted. The carriage 13 is moved by the carriage moving unit 14 in the main scanning direction. Detailed configurations of the carriage 13, the printing unit 16, the imaging portion 17, the spectrometer 18, and the shutter mechanism 19 will be described later.

Here, the main scanning direction (in X-axis direction) corresponds to one direction of the invention.

In the description with respect to the main scanning direction, the −X side may be referred to as a home side and the +X side may be referred to as a full side. Here, the home is a position to which the carriage 13 retreats and enters a standby state when printing processing is not conducted. The full side is opposite to the home side.

The carriage moving unit 14 reciprocates the carriage 13 in the X-direction based on the instruction from the control unit 15. That is, the carriage moving unit 14 corresponds to a first moving mechanism of the invention.

The carriage moving unit 14 is configured to include, for example, a carriage guide shaft 141, a carriage motor 142, and a timing belt 143.

The carriage guide shaft 141 is disposed in the X-direction and, for example, both ends are fixed to a casing of the printer 1. The carriage motor 142 drives the timing belt 143. The timing belt 143 is supported substantially parallel to the carriage guide shaft 141, and a portion of the carriage 13 is fixed thereto. When the carriage motor 142 is driven based on the instruction from the control unit 15, the timing belt 143 travels in the forward and reverse directions and the carriage 13 fixed to the timing belt 143 is guided by the carriage guide shaft 141 to be reciprocated.

The maintenance unit 20 is used when maintenance is performed on a nozzle unit 161 (see FIG. 3), which is provided in the printing unit 16 and will be described later. The maintenance unit 20 is provided at the home position of the printer 1 as illustrated in FIG. 1 and FIG. 3. The printer 1 includes a cap or a suction pump or the like (not illustrated) for sucking inks from nozzles provided in the nozzle unit 161 after the carriage 13 is moved to the home position during maintenance.

The control unit 15, as illustrated in FIG. 2, is configured to include an I/F 151, a unit control circuit 152, a memory 153, and a central processing unit (CPU) 154.

The I/F 151 inputs printing data input from the external device 30 to the CPU 154.

The unit control circuit 152 includes control circuit that respectively controls the supply unit 11, the transport unit 12, the carriage moving unit 14, the maintenance unit 20, the printing unit 16, the imaging portion 17 (that is, light source portion 172 and imaging element 174), and the spectrometer 18 and controls operations of respective units based on an instruction signal from the CPU 154. The control circuits of respective units may be provided separately from the control unit 15 and may also be connected to the control unit 15.

The memory 153 stores various data or various programs for controlling operations the printer 1. As various data, printing profile data in which, for example, an ink ejection amount of each ink for color data contained as printing data is stored may be included. Light emission characteristics for each frequency of a light source portion 172, light reception characteristics (light reception sensitivity characteristics) for each frequency of an imaging element 174, or the like may be stored in the memory 153.

The CPU 154 reads various programs stored in the memory 153 and executes the programs to thereby conduct driving control of the supply unit 11, the transport unit 12, and the carriage moving unit 14, printing control of the printing unit 16, image-capturing control of the imaging portion 17, spectrometry control of the spectrometer 18, adjustment processing (for example, density unevenness correction (banding correction) processing or color shift correction processing) based on the imaging portion 17 and the spectrometer 18 and the like. Detailed functions of the CPU 154 will be described later.

Carriage Configuration

Next, configurations of the carriage 13 and the printing unit 16, the imaging portion 17, the spectrometer 18, and the shutter mechanism 19 that are provided in the carriage 13 will be described.

Figure 4:
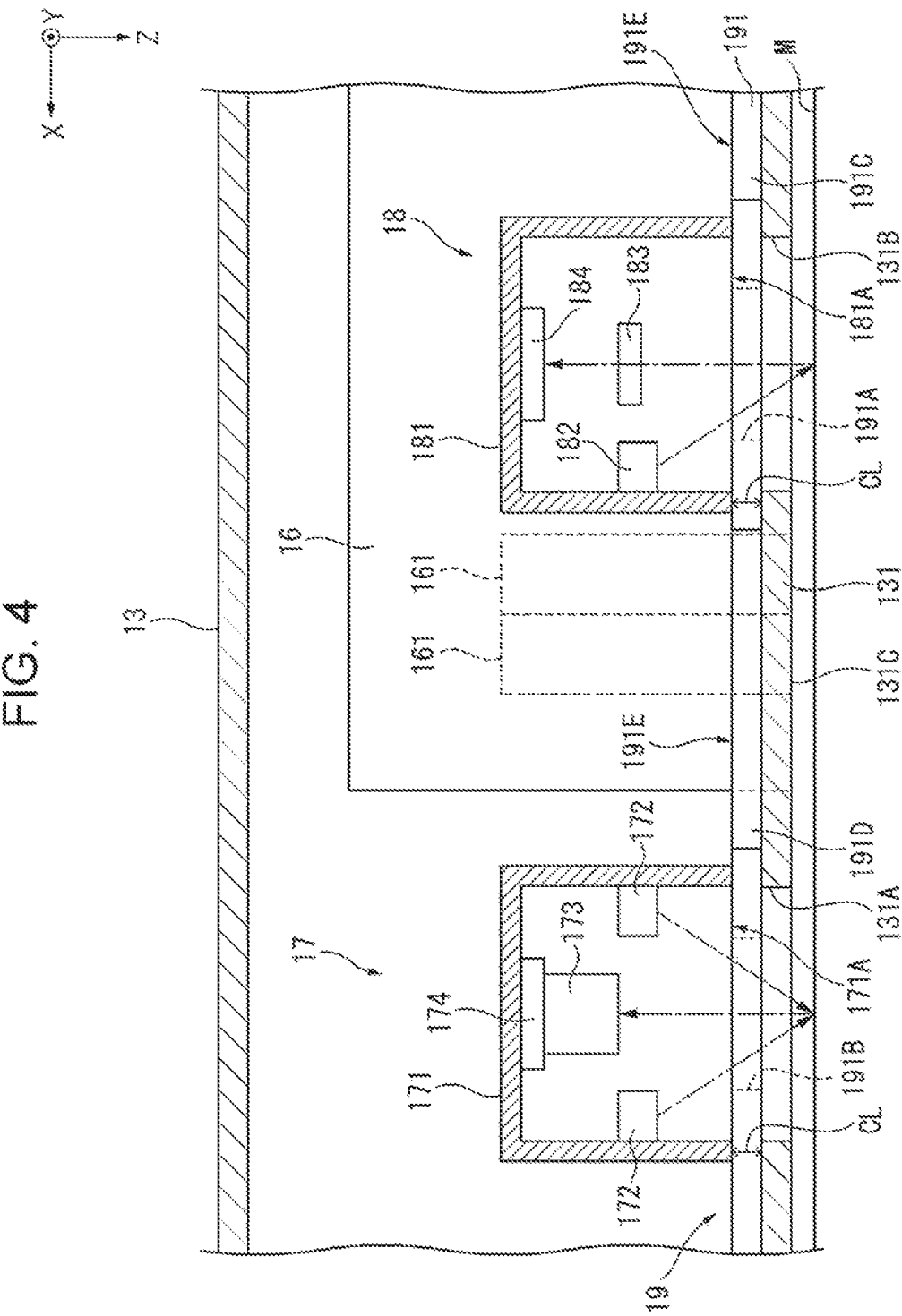
FIG. 4 is a sectional view illustrating a schematic configuration of a carriage of the first embodiment.
Figure 5:
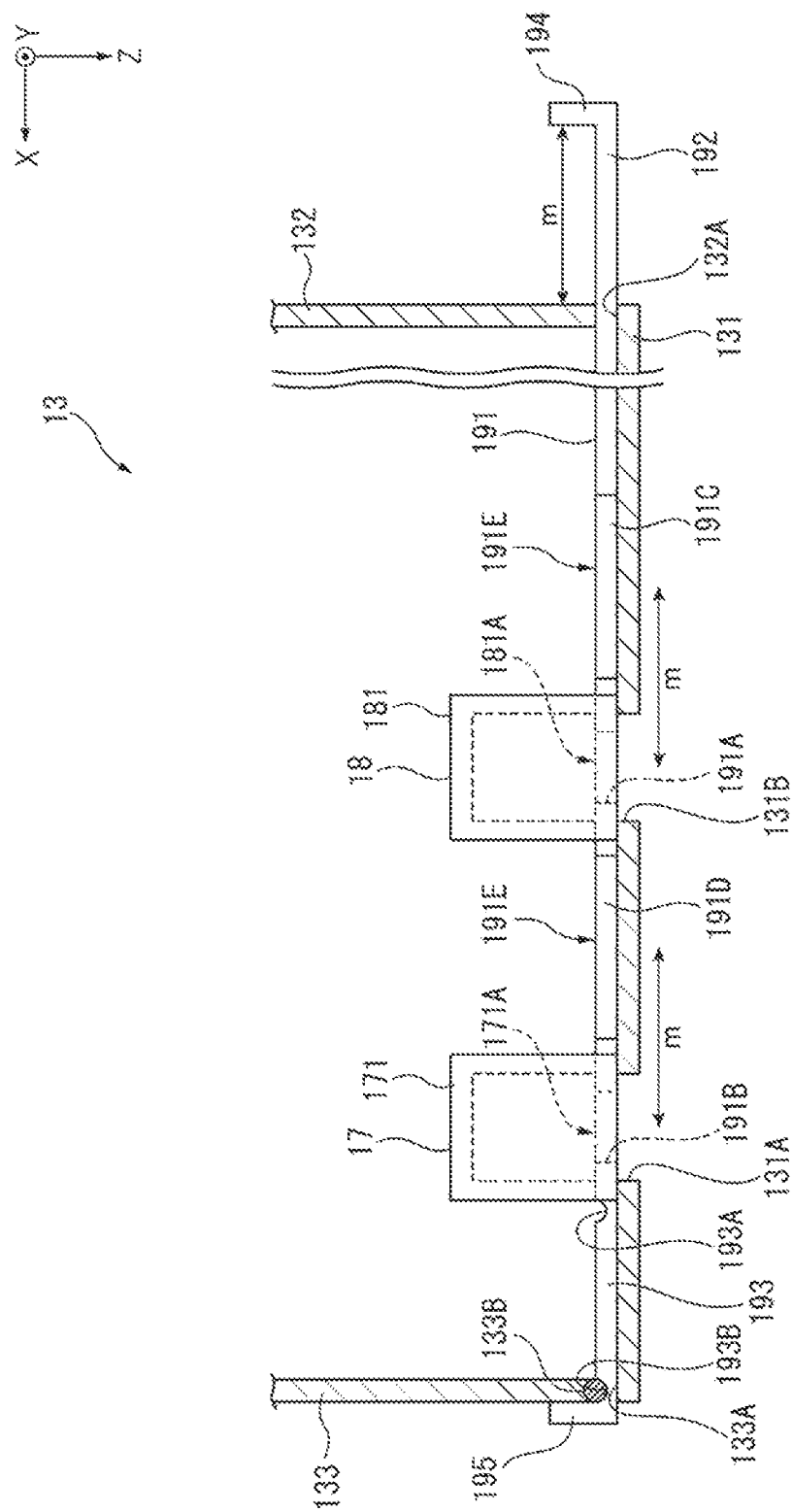
FIG. 5 is a sectional view illustrating another schematic configuration of the carriage of the first embodiment.
Figure 6:
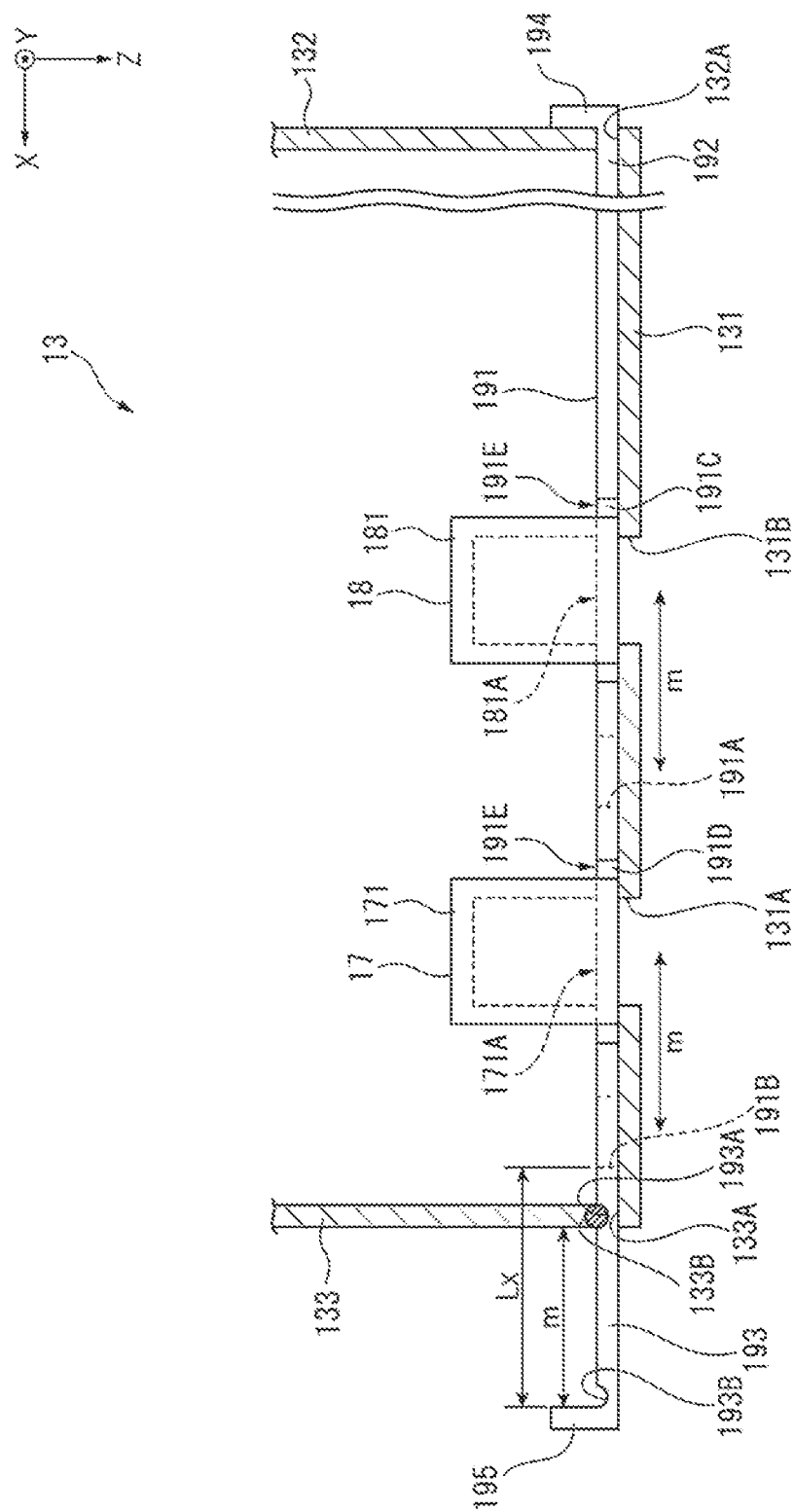
FIG. 6 is a sectional view schematically illustrating another configuration of the main portions of the printer of the first embodiment.

FIG. 4 is a sectional view illustrating schematic configurations of the carriage 13 and the printing unit 16, the imaging portion 17, the spectrometer 18, and the shutter mechanism 19 and FIG. 5 and FIG. 6 are sectional view illustrating schematic configurations of the carriage 13 and the shutter mechanism 19.

As illustrated in FIG. 3 and FIG. 4, the carriage 13 is a casing on which the printing unit 16, the imaging portion 17, the spectrometer 18, and the shutter mechanism 19 are mounted and is configured to be able to move in the X-direction that is, the main scanning direction by the carriage moving unit 14. Among these components described above, the printing unit 16, the imaging portion 17 and the spectrometer 18 are connected to the control unit 15 by a flexible circuit 130 (see FIG. 1) and are driven based on a control signal from the control unit 15.

Although details will be described later, the shutter 191 provided in the shutter mechanism 19 is configured to be able to change a state where the opening window 181A of the imaging portion 17 and the opening window 181A of the spectrometer are covered and a state where light is capable of being incident on respective opening windows 171A and 181A, in accordance with the movement of the carriage 13 in the X-direction.

On the bottom surface (surface of +Z side) 131 of the carriage 13, a first opening 131A which allows reflected light from the medium M to be incident on the imaging portion 17 and a second opening 131B which allows reflected light from the medium M to be incident on the spectrometer are formed (see FIG. 4 and FIG. 5). The respective openings 131A and 131B correspond to an opening portion. On the bottom surface 131, nozzle openings 131C exposing nozzles of the printing unit 16, which will be described later, are formed. On a first carriage side surface 132 of the −X side of the carriage 13, an insertion hole 132A into which a shutter 191 of the shutter mechanism 19, which will be described later, is inserted is formed. On a second carriage side surface 133 of the +X side of the carriage 13, an insertion hole 133A into which the shutter 191 is inserted is formed. In the insertion hole 133A, as illustrated in FIG. 5 and FIG. 6, a positioning member 133B, which is engaged with a first concave portion 193A and a second concave portion 193B of the shutter 191 and which positions and fixes the shutter 191, is disposed. The positioning member 133B is, for example, formed with an elastic material such as rubber.

Printing Unit Configuration

The printing unit 16 performs printing processing (image forming processing for a medium M) for forming an image on the medium M by individually ejecting inks onto the medium M, in a portion opposing the medium M, based on an instruction signal from the control unit 15.

The printing unit 16, as illustrated in FIG. 3, is configured to include nozzle unit 161 corresponding to a plurality of color inks, an ink cartridge (not illustrated) supplying inks to respective nozzle units 161, and supply pipes (not illustrated) supplying inks from the ink cartridge to the nozzle units 161.

The nozzle units 161 are provided to respectively correspond to each color (for example, cyan, magenta, yellow, light cyan, light magenta, gray, light gray, mat black, photo black) to be ejected onto the medium M. Nozzles (not illustrated) ejecting ink droplets are provided in the nozzle units 161. In the nozzles, for example, a piezo element is disposed and ink droplets supplied from an ink tank by driving the piezo element are ejected onto the +Z side and are deposited onto the medium M, dots are formed. In the nozzle unit 161 configured as described above, as illustrated in FIG. 4, an end portion of the +Z side is disposed within the nozzle opening 131C and a tip of the nozzle is exposed from the nozzle opening 131C.

Imaging Portion Configuration

The imaging portion 17 corresponds to an optical device of the invention, includes a casing 171, a light source portion 172, a light guide optical system 173, and imaging element 174 as illustrated in FIG. 4, and performs imaging processing for capturing an image of a predetermined imaging area on the medium M, based on an instruction signal from the control unit 15. That is, in the imaging portion 17, the imaging area is irradiated with light from the light source portion 172 to be illuminated and reflected light from the imaging area is received by the imaging element 174 through the light guide optical system 173 to thereby capture an image of the imaging area. In the first embodiment, the imaging portion 17, as illustrated in FIG. 3 and FIG. 4, is provided closer to the full side in the X-direction and the +Y side (downstream side) in the Y-direction, compared to the printing unit 16.

The casing 171 is formed with, for example, a material such as aluminum having a light weight and with a higher heat conductivity and accommodates the light source portion 172, the light guide optical system 173, and the imaging element 174.

An opening window 171A which corresponds to a window of the invention is provided in the lower surface (surface of +Z side) of the casing 171. The opening window 171A is formed in the shape which is the same as that of, for example, an opening 131A provided on the bottom surface 131 of the carriage 13 and is disposed to overlap the opening 131A. In the first embodiment, as illustrated in FIG. 3, an end portion 171B of the +Y side and an end portion 171C of the −Y side are fixed to the bottom surface 131 of the carriage 13 in the lower surface side of the casing 171. As illustrated in FIG. 4, a clearance CL is formed between the casing 171 and the bottom surface 131 of the carriage 13 in formation positions of the opening window 171A and the opening 131A. Dimensions of the clearance CL in the Z-direction correspond to dimensions capable of allowing the shutter 191 of the shutter mechanism 19 to be inserted.

The light source portion 172 illustrated in FIG. 4 is turned on based on an instruction signal from the control unit 15 and illuminates an area including an imaging area. The light source portion 172 is constituted with a light source, of which size is small and electric power consumption is small, such as an LED and various light guide members by which a predetermined area of the medium M is irradiated with illumination light emitted from the light source as needed, and is fixed to the side surface of the casing 171. In the first embodiment, although a configuration in which two light source portion 172 are provided so as to sandwich the imaging element 174 in the X-direction is exemplified, two light source portions 172 may be disposed so as to sandwich the imaging element 174 in, for example, the Y-direction. A single light source portion 172 may also be provided. Also, three or more light source portions 172 may be provided around the imaging element 174 at, for example, equal intervals, and as a result, it is possible to uniformly illuminate the imaging area with a simple configuration.

The light guide optical system 173 is constituted with optical members such as a single or a plurality of lenses, or a single or a plurality of apertures and guides light reflected by the imaging area on the medium M and passed through the opening 131A of the carriage 13 and the opening window 171A of the casing 171 to the imaging element 174.

The imaging element 174 is an RGB image sensor having a plurality of pixels, is disposed on an optical axis of the light guide optical system 173, receives light reflected by a predetermined imaging area on the medium M, and captures an image of the imaging area. An image signal output from the imaging element 174 is input to the control unit 15 through an I-V converter (not illustrated), an amplifier (not illustrated), and an AD converter (not illustrated).

Spectrometer Configuration

The spectrometer 18, as illustrated in FIG. 4, is configured to include a casing 181, a light source portion 182, a spectral device 183, a light receiving unit 184 and the like and measures a spectral spectrum for a predetermined position in the medium M. That is, in the spectrometer 18, the light source portion 182 is turned on, light reflected on the medium M is guided to the spectral device 183, light having a predetermined wavelength and spectrally dispersed by the spectral device 183 is received by the light receiving unit 184. The spectrometer 18 is provided closer to the home side in the X-direction, compared to the imaging portion 17 and provided closer to the +Y side (downstream side) in the Y-direction, compared to the printing unit 16.

In the first embodiment, spectrometry is performed in compliance with a method in an optical-geometrical condition (45° x: 0°) specified by colorimetric standard (JIS Z 8722). That is, in the first embodiment, illumination light from the light source portion 182 is made incident on the measurement target at an incident angel of 45°±2° and receives light reflected in the normal direction at an angle of 0°±10° in the measurement target by the light receiving unit 184.

The casing 181 accommodates the light source portion 182, the spectral device 183, and the light receiving unit 184. The casing 181 is configured similarly to the casing 171 and the opening window 181A corresponding to a window of the invention is provided on the lower surface (surface of +Z side) of the casing 181. The opening window 181A is provided to overlap, for example, the second opening 131B provided on the bottom surface 131 of the carriage 13. The casing 181 is fixed to an end portion 181B of the +Y side in the lower surface side and fixed to the bottom surface 131 of the carriage 13 in an end portion 181C of the -Y side. As illustrated in FIG. 4, a clearance CL is formed between the casing 181 and the bottom surface 131 of the carriage 13 in formation positions of the opening window 181A and the second opening 131B. Dimensions of the clearance CL in the Z-direction correspond to dimensions capable of allowing the shutter 191 of the shutter mechanism 19 to be inserted.

The medium M is irradiated with illumination light by the light source portion 182. The light source portion 182 is constituted with a light source such as a halogen lamp, an LED, or an LD (semiconductor laser) and various light guide members by which a predetermined area of the medium M is irradiated with illumination light emitted from the light source. The light guide members may include, for example, a single or a plurality of aperture, or a single or a plurality of lenses.

The light receiving unit 184 is disposed on an optical axis of the spectral device 183, receives light transmitted through the spectral device 183 is received in a light receiving area, and outputs a detection signal (a current value) according to the amount of received light. The detection signal output by the light receiving unit 184 is input to the control unit 15 through an I-V converter (not illustrated), an amplifier (not illustrated), and an AD converter (not illustrated).

Figure 7:
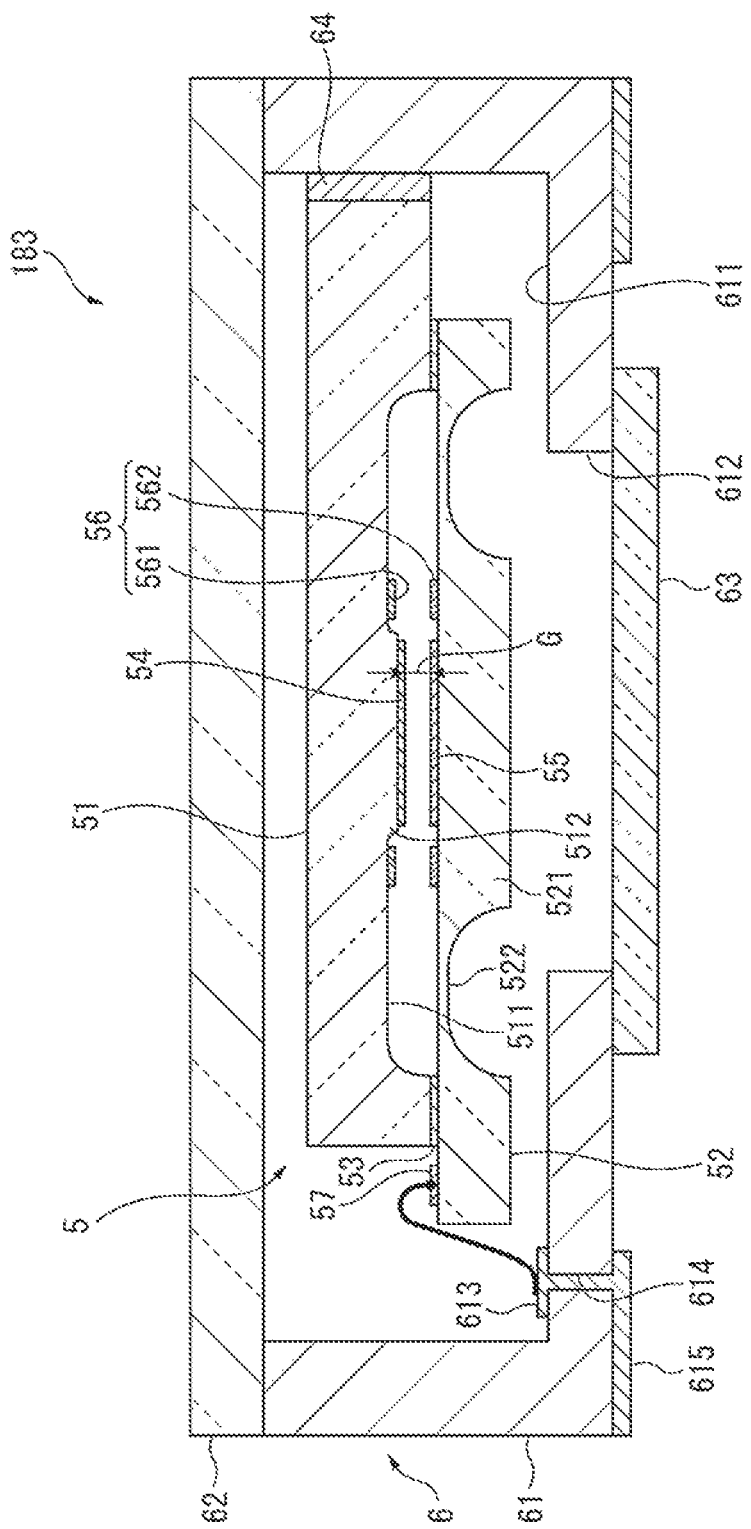
FIG. 7 is a sectional view illustrating a schematic configuration of a spectral device of the first embodiment.

FIG. 7 is a sectional view illustrating a schematic configuration of the spectral device 183.

The spectral device 183 includes a filter casing 6 and a wavelength variable interference filter 5 (spectral element) accommodated inside the filter casing 6.

The wavelength variable interference filter 5 is a wavelength variable type Fabry-Perot etalon element. In the first embodiment, although an example in which the wavelength variable interference filter 5 is disposed in the spectrometer 18 in a state where the wavelength variable interference filter 5 is accommodated in the filter casing 6. A configuration in which the wavelength variable interference filter 5 is directly disposed in the spectrometer 18 without using, for example, the filter casing 6 may also be adopted.

The wavelength variable interference filter 5, as illustrated in FIG. 7, includes a fixed substrate 51 and a movable substrate 52 having light transmissivity to visible light and the fixed substrate 51 and the movable substrate 52 are bonded by a bonding film 53 to be integrally formed such that the fixed substrate 51 and the movable substrate 52 are integrally configured. In the fixed substrate 51, a first groove portion 511 formed by etching and a second groove portion 512 of which a depth of groove is shallower than the first groove portion 511 are provided. A fixed electrode 561 and a fixed reflection film 54 are provided on the first groove portion 511 and the second groove portion 512, respectively. For example, the fixed reflection film 54 is made up of a metal film such as Ag, an alloy film such as Ag alloy, a dielectric multiplayer film obtained by laminating a high-refraction layer and a low-refraction layer, or a laminate obtained by laminating a metal film (alloy film) and a dielectric multilayer film.

The movable substrate 52 includes a movable portion 521 and a holding unit 522 provided outside the movable portion 521 and holding the movable portion 521. On a surface opposing the fixed substrate 51 of the movable portion 521, a movable electrode 562 opposing a fixed electrode 561 and a movable reflection film 55 opposing the fixed reflection film 54 are provided. As the movable reflection film 55, a reflection film having the same configuration as the fixed reflection film 54 described above may be used. The holding unit 522 is a diaphragm surrounding a periphery of the movable portion 521 and is formed to have thickness dimension smaller than that of the movable portion 521.

In the wavelength variable interference filter 5 described above, an electrostatic actuator 56 is configured by the fixed electrode 561 and the movable electrode 562 and a voltage is applied to the electrostatic actuator 56 so as to make it possible to change gap dimension of a gap G between the fixed reflection film 54 and the movable reflection film 55. In the outer periphery (area which does not oppose fixed substrate 51) of the movable substrate 52, a plurality of electrode pads 57 individually connected to the fixed electrode 561 or the movable electrode 562 are provided.

The filter casing 6, as illustrated in FIG. 7, includes a base 61 and a glass substrate 62. The base 61 and the glass substrate 62, for example, are bonded by low melting point glass bonding or the like to form an accommodation space inside thereof, and the wavelength variable interference filter 5 is accommodated inside the accommodation space.

The base 61, for example, is configured by laminating thin plate-shaped ceramics and includes a concave portion 611 capable of accommodating the wavelength variable interference filter 5. The wavelength variable interference filter 5, for example, is fixed to a side surface of the concave portion 611 of the base 61 by a fixing member 64. On the bottom surface of the concave portion 611 of the base 61, a light-transmitting hole 612 is provided and a cover glass 63 covering the light-transmitting hole 612 is bonded.

In the base 61, an internal terminal portion 613 connected to the electrode pad 57 of the wavelength variable interference filter 5 is provided, and the internal terminal portion 613 is connected to an external terminal portion 615 provided outside of the base 61 through a conductive hole 614. The external terminal portion 615 is electrically connected to the control unit 15.

Shutter Mechanism Configuration

As illustrated in FIG. 5 and FIG. 6, the shutter mechanism 19 is configured to include the shutter 191 for covering respective opening windows 171A and 181A and respective openings 131A and 131B, a first insertion portion 192 inserted into the insertion hole 132A in the X-direction in the −X side of the shutter 191, a second insertion portion 193 inserted into the insertion hole 133A in the X-direction in the +X side of the shutter 191, a first end portion 194 provided on an −X side end portion of the first insertion portion 192, and a second end portion 195 provided on an +X side end portion of the second insertion portion 193, and allow the shutter 191 to move in the X-direction.

A second moving mechanism is configured to include the first insertion portion 192, the second insertion portion 193, the first end portion 194, and the second end portion 195 of the shutter mechanism 19, respective insertion holes 132A and 133A of the carriage 13, the inner surface 102A of the first side surface portion 102, and the inner surface 103A of the second side surface portion 103.

The shutter mechanism 19 is able to move the shutter 191 between a first position (illustrated in FIG. 6 and also referred to as blocked position in the following) at which respective opening windows 171A and 181A are blocked by the shutter 191 and a second position (illustrated in FIG. 5 and also referred to as exposed position in the following) at which respective opening windows 171A and 181A are open, in the X-direction. When the shutter 191 is in the exposed position, the imaging portion 17 and the spectrometer 18 are able to receive light form the medium M. On the other hand, when the shutter 191 is in the blocked position, respective opening windows 171A and 181A and respective openings 131A and 131B of the carriage 13 are blocked. With this, it is possible to suppress contaminants such as ink mist from attaching to the imaging portion 17 and the spectrometer 18 or from infiltrating into the carriage 13.

The shutter 191 is disposed in the −Z side of the bottom surface 131, has an appearance which is substantially a rectangular shape in a plan view when viewed from the Z-direction, is a plate-shaped member of which the longitudinal direction is the Y-direction (see FIG. 3), and has appearance dimensions (dimensions in X-direction and Y-direction) capable of enabling respective opening windows 171A and 181A to be blocked. Y-direction dimension of the shutter 191 is substantially the same as that of each of the opening windows 171A and 181A. The shutter 191 has thickness dimension (Z-direction dimension) which allows the shutter 191 to be inserted into clearance CL formed between the casings 171 and 181 and the bottom surface 131 of the carriage 13. The shutter 191 is disposed closer to the −Z side, compared to tips of nozzles of the nozzle unit 161.

The shutter 191 includes a first passing-hole 191A which is an opening for enabling light to pass through the opening window 181A of the spectrometer 18 and a second passing-hole 191B which is an opening for enabling light to pass through the opening window 171A of the imaging portion 17. The first passing-hole 191A and the second passing-hole 191B are formed at positions where the first passing-hole 191A and the second passing-hole 191B overlap corresponding opening windows 171A and 181A in the Z-direction when the shutter 191 is disposed in the exposed position illustrated in FIG. 5.

When the shutter 191 is disposed in the blocked position illustrated in FIG. 6, a first reference member 191C is disposed at a position where the opening window 171A is blocked and a second reference member 191D is disposed at a position where the opening window 181A is blocked.

In the first reference member 191C and the second reference member 191D, surfaces of the imaging portion 17 and the spectrometer 18 sides are white reference surfaces 191E which become measurement targets when white calibration of the imaging portion 17 and the spectrometer 18 is performed and respective white reference surfaces 191E have a white surface. The white reference surfaces 191E are formed by, for example, white color paint coated on the surface of the shutter 191. A portion of the −Z side surface or the entire −Z side surface of the shutter 191 may be coated with white color paint or the entire surface of the shutter 191 may be coated with white color paint.

Dimensions of the first reference member 191C and the second reference member 191D in the X-direction are equal to or greater than dimensions of the corresponding opening windows 171A and 181A. Each of a distance between the center of the first passing-hole 191A and the center of the first reference member 191C and a distance between the center of the second passing-hole 191B and the center of the second reference member 191D in the X-direction is an amount of movement m of the shutter 191, that is, a pushing amount m of the first insertion portion 192 and the second insertion portion 193.

The first insertion portion 192 is integrally formed with the shutter 191, is extended from the shutter 191 to the −X side, and the first end portion 194 is provided in the end portion of the −X side. The first insertion portion 192 is inserted into the insertion hole 132A to be movable in the X-direction. In a case where the position of the shutter 191 corresponds to the exposed position, a portion of the first insertion portion 192, as illustrated in FIG. 5, protrudes to the −X side of the carriage 13. That is, a protruding portion is configured by the first insertion portion 192 and the first end portion 194.

The second insertion portion 193 is integrally formed with the shutter 191, is extended from the shutter 191 to the +X side, and the second end portion 195 is provided in the end portion of the +X side. The second insertion portion 193 is inserted into the insertion hole 133A to be movable in the X-direction. Dimension Lx (distance between first passing-hole 191A and second end portion 195) of the second insertion portion 193 in the X-direction is greater than or equal to the amount of movement m of the shutter 191. In a case where the position of the shutter 191 corresponds to the blocked position, a portion of the second insertion portion 193, as illustrated in FIG. 6, protrudes to the +X side of the carriage 13. That is, a protruding portion is configured by the second insertion portion 193 and the second end portion 195.

As described above, the dimension Lx of the second insertion portion 193 in the X-direction is made greater than the amount of movement m of the shutter 191 such that a portion of the second insertion portion 193 exposed to the outside of the carriage 13 does not come into contact with the opening window 171A in the blocked position. For that reason, it is possible to suppress inks attached to the second insertion portion 193 from attaching to the imaging portion 17 or the spectrometer 18.

The first concave portion 193A for positioning the position of the second insertion portion 193, that is, the position of the shutter 191, in the blocked position and the second concave portion 193B for positioning the position of the second insertion portion 193 in the exposed position are provided on the surface of the −Z side of the second insertion portion 193, and the first concave portion 193A and the second concave portion 193B are provided in the Y-direction. The second concave portion 193B is provided in the +X side end portion of the second insertion portion 193. On the other hand, the first concave portion 193A is provide in the −X side of the second concave portion 193B by being separated from the second concave portion 193B by the amount of movement m of the shutter 191.

According to the configuration as described above, when the shutter 191 is moved to the blocked position, the positioning member 133B is fitted into the first concave portion 193A such that the shutter 191 is fixed. Also, when the shutter 191 is moved to the exposed position, the positioning member 133B is fitted into the second concave portion 193B such that the shutter 191 is fixed. With this, it is possible to fix the position of the shutter 191 to the exposed position and the blocked position and suppress the opening windows 171A and 181A from being exposed by the movement of the shutter 191 during printing or the like.

The first end portion 194 is provided in the −X side end portion of the first insertion portion 192 and extends from the first insertion portion 192 to the −Z side. The first end portion 194 abuts the first carriage side surface 132 such that a relative movement of the shutter 191 to the +X side with respect to the carriage 13 is regulated. The first end portion 194 abuts the first side surface portion 102 (which corresponds to an abutting portion of the invention) of the unit casing 10 illustrated in FIG. 3 such that the movement of the shutter 191 to the −X side is stopped.

The second end portion 195 is provided in the +X side end portion of the second insertion portion 193 and extends from the second insertion portion 193 to the −Z side. The second end portion 195 abuts the second carriage side surface 133 such that a relative movement of the shutter 191 to the −X side with respect to the carriage 13 is regulated. The second end portion 195 abuts the second side surface portion 103 (which corresponds to an abutting portion of the invention) of the unit casing 10 illustrated in FIG. 3 such that the movement of the shutter 191 to the +X side is stopped.

Operations of Carriage and Shutter Mechanism

Next, operations of the shutter mechanism 19 according to the carriage 13 will be described.

Figure 8:
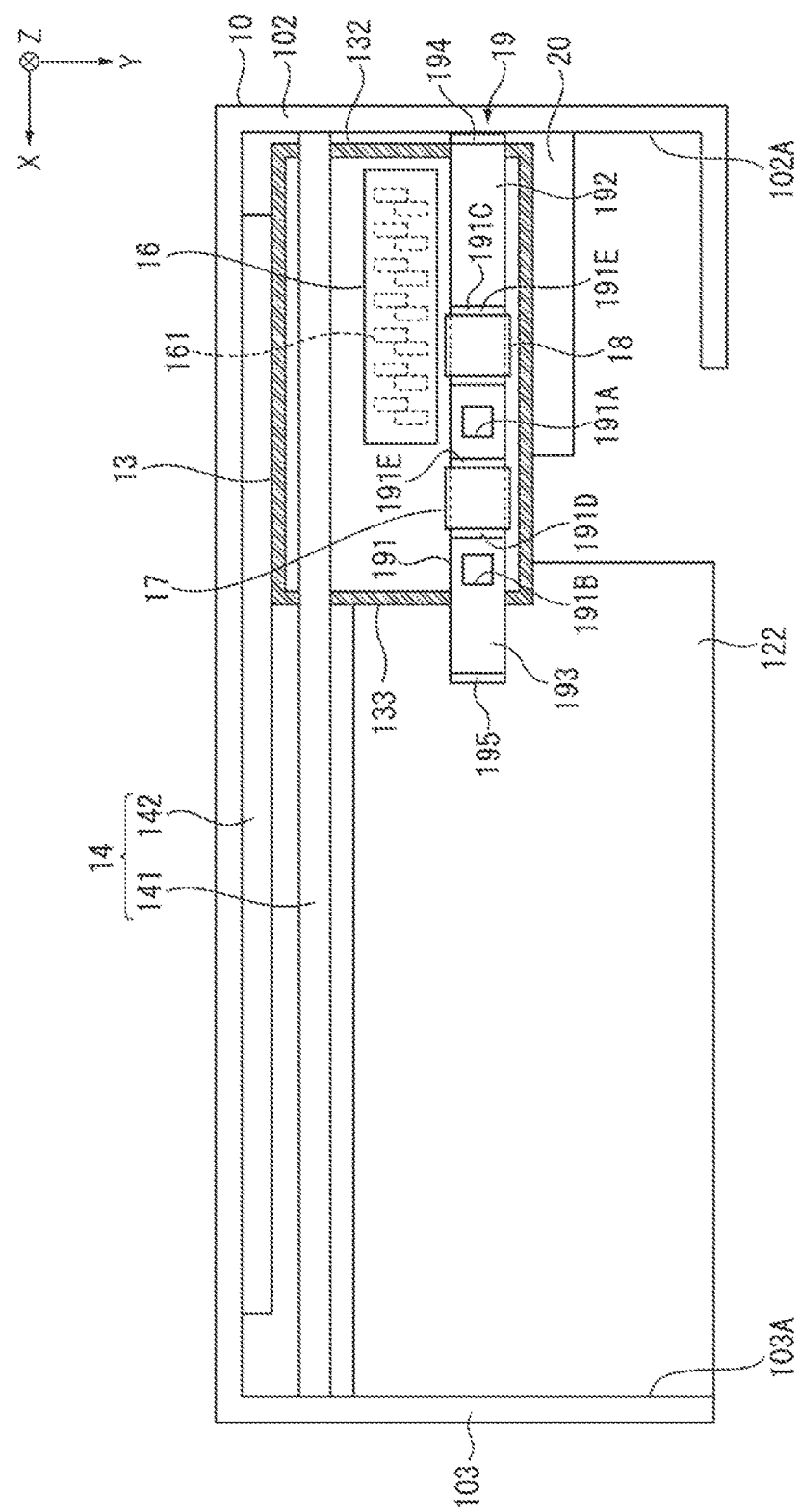
FIG. 8 is a plan view schematically illustrating another configuration of the main portions of the printer of the first embodiment.
Figure 9:
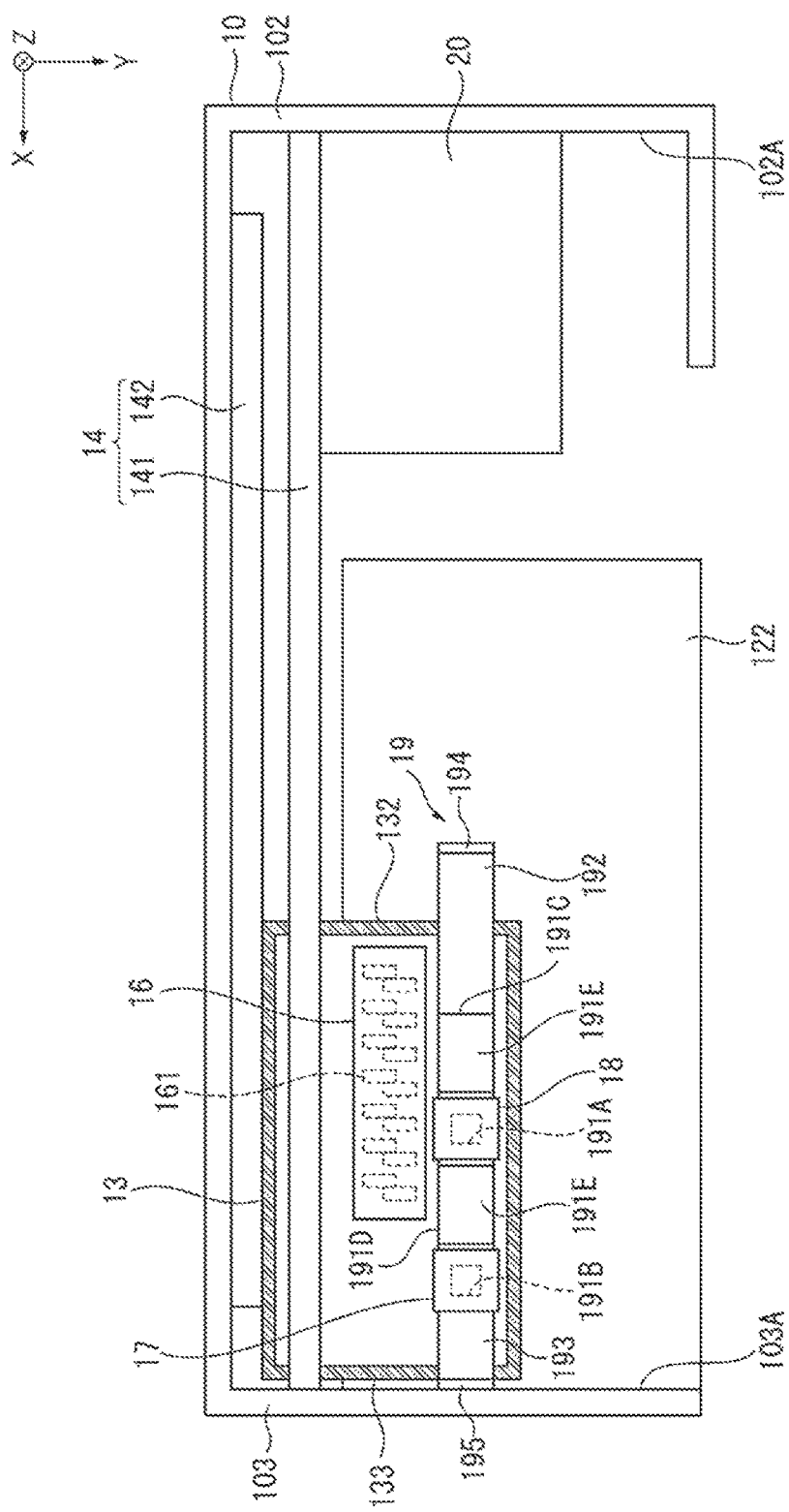
FIG. 9 is a plan view schematically illustrating another configuration of the main portions of the printer of the first embodiment.

FIG. 8 and FIG. 9 are sectional views illustrating schematic configurations of the carriage 13, the printing unit 16, the imaging portion 17, and the shutter mechanism 19. FIG. 8 illustrates a case where the shutter 191 is set in the blocked position and FIG. 9 illustrates a case where the shutter 191 is set in the exposed position.

The printer 1 moves the shutter 191 to the exposed position, for example, when imaging processing by the imaging portion 17 and spectrometry processing by the spectrometer 18 (main measurement) are performed and moves the shutter 191 to the blocked position in situations other than imaging processing and spectrometry processing (for example, at the time of ejecting inks during printing processing, maintenance processing or the like, or during standby).

As illustrated in FIG. 8, when the shutter 191 is moved to the blocked position, the carriage 13 is moved to the home, that is, the −X side by the carriage moving unit 14. When the first end portion 194 abuts the inner surface 102A of the first side surface portion 102 in accordance with the movement of the carriage 13, the movement of the shutter 191 to the −X side with respect to the unit casing 10 is stopped. In a state where the shutter 191 is stopped with respect to the unit casing 10, the carriage 13 is moved to the −X side until the first end portion 194 abuts the first carriage side surface 132. During the movement of the carriage 13, the shutter 191 is moved relatively to the +X side with respect to the carriage 13 and as illustrated in FIG. 8, the shutter 191 is moved to the blocked position.

Thereafter, the printer 1 moves the carriage 13 from the home position to the +X side, conducts printing processing or conducts maintenance processing in a state where the carriage 13 is moved to the home position. With this, even when ink mist occurs at the time of ejecting inks, it is possible to suppress the imaging portion 17 from being contaminated by the ink mist or suppress the ink mist from infiltrating into the carriage 13. Even in a case a standby state where the processing described above is not conducted, the printer 1 sets the shutter 191 to be located in the blocked position to thereby make it possible to suppress dust from infiltrating into the carriage 13 or the imaging portion 17.

On the other hand, as illustrated in FIG. 9, when the shutter 191 is moved to the exposed position, the carriage 13 is moved to the full, that is, the +X side by the carriage moving unit 14. When the second end portion 195 abuts the inner surface 103A of the second side surface portion 103 in accordance with the movement of the carriage 13, the movement of the shutter 191 to the +X side with respect to the unit casing 10 is stopped. In a state where the shutter 191 is stopped with respect to the unit casing 10, the carriage 13 is moved to the +X side until the second end portion 195 abuts the second carriage side surface 133. During the movement of the carriage 13, the shutter 191 is moved relatively to the −X side with respect to the carriage 13 and as illustrated in FIG. 7, the shutter 191 is moved to the exposed position.

Functional Configuration of CPU

Figure 10:
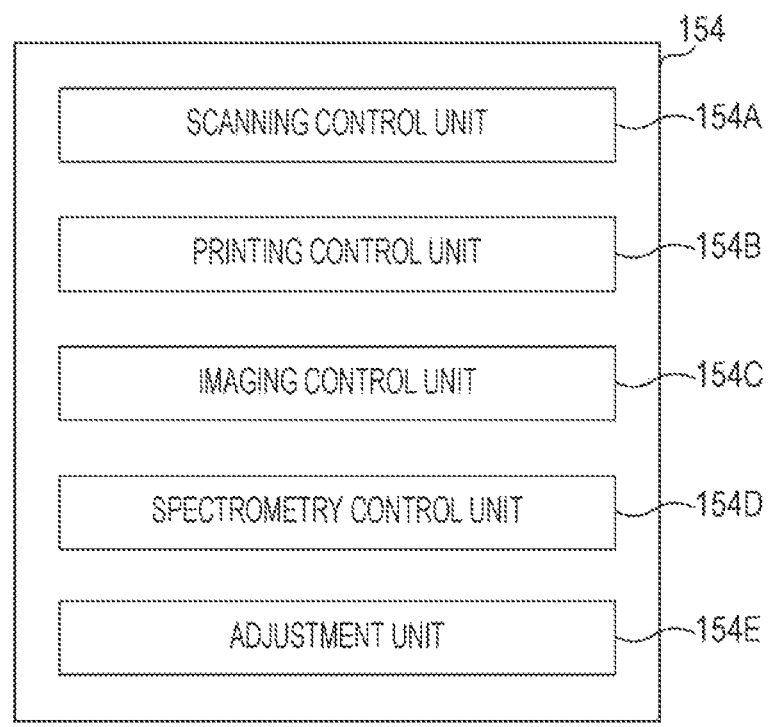
FIG. 10 is a block diagram illustrating functions of a CPU of the first embodiment.

FIG. 10 is a block diagram illustrating a functional configuration of the CPU 154 of the first embodiment.

The CPU 154 reads various programs stored in the memory 153 to thereby function as a scanning control unit 154A, a printing control unit 154B, an imaging control unit 154C, a spectrometry control unit 154D, and an adjustment unit 154E as illustrated in FIG. 10.

The scanning control unit 154A corresponds to the movement control unit and outputs an instruction signal to drive the supply unit 11, the transport unit 12, and the carriage moving unit 14 to the unit control circuit 152. With this, the unit control circuit 152 causes the roll driving motor of the supply unit 11 to be driven to allow the medium M to be supplied to the transport unit 12. The unit control circuit 152 causes the transport motor of the transport unit 12 to be driven to allow the medium M to be transported in the Y-direction until a predetermined area of the medium M is set to a position opposing the carriage 13 of the platen 122. The unit control circuit 152 causes the carriage motor 142 of the carriage moving unit 14 to be driven to allow the carriage 13 to be moved in the X-direction.

The scanning control unit 154A corresponds to the movement control means, and outputs an instruction signal to the unit control circuit 152 to drive the carriage moving unit 14 when a position of the shutter 191 is to be changed. When the shutter 191 is intended to be moved to the blocked position, the unit control circuit 152 causes the carriage moving unit 14 to be driven to allow the carriage 13 to be moved to the home. When the shutter 191 is intended to be moved to the exposed position, the unit control circuit 152 causes the carriage moving unit 14 to be driven to allow the carriage 13 to be moved to the full.

The printing control unit 154B corresponds to a printing control unit and outputs a printing instruction signal to drive and control the supply unit 11, the transport unit 12, the carriage moving unit 14, and the printing unit 16 to the unit control circuit 152 based on, for example, printing data input from the external device 30. The unit control circuit 152 outputs a printing control signal to the printing unit 16 and causes piezo elements provided in the nozzles to be driven to allow inks to be ejected onto the medium M. When printing is conducted, a dot forming operation for moving the carriage 13 in the X-direction and ejecting inks from the printing unit 16 during the movement of carriage 13 and a transporting operation for transporting the medium M in the Y-direction are alternately repeated and an image configured by a plurality of dots is printed on the medium M.

The imaging control unit 154C corresponds to the measurement control means and conducts imaging processing by the imaging portion 17. Specifically, the imaging control unit 154C outputs an image-capturing instruction signal to drive the imaging portion 17 to the unit control circuit 152. The unit control circuit 152 outputs an image-capturing control signal to the imaging portion 17 based on the image-capturing instruction signal and causes the imaging portion to acquire data for image capturing of a predetermined area in the medium M. In this case, when the light source portion 172 needs to be turned on, the imaging control unit 154C outputs an instruction signal instructing to turn on the light source portion 172 to the unit control circuit 152. The imaging control unit 154C stores captured data for image capturing in the memory 153.

The spectrometry control unit 154D corresponds to measurement control means and performs spectrometry processing by the spectrometer 18. The spectrometry control unit 154D outputs a measurement instruction signal to drive the spectrometer 18 to the unit control circuit 152. The unit control circuit 152 outputs a measurement control signal to the imaging portion 17 based on the measurement instruction signal and performs spectrometry processing for a predetermined area in the medium M.

That is, the light source portion 182 is to be turned on, the spectrometry control unit 154D outputs an instruction signal to turn on the light source portion 182 to the unit control circuit 152.

The spectrometry control unit 154D reads a driving voltage to the electrostatic actuator 56 with respect to a wavelength of light transmitted by the wavelength variable interference filter 5 from V-λ data of the memory 153 and outputs an instruction signal to the unit control circuit 152. With this, the unit control circuit 152 applies the instructed driving voltage to the wavelength variable interference filter 5 and light having a desired transmission wavelength is transmitted by the wavelength variable interference filter 5.

The spectrometry control unit 154D stores a measurement value according to a light amount (amount of received light) of light received by the light receiving unit 184 in the memory 153 in association with a voltage applied to the electrostatic actuator 56 (or wavelength of light transmitted through wavelength variable interference filter 5 corresponding to the voltage).

The adjustment unit 154E performs, for example, a correction density unevenness correction or a color shift correction based on an imaging result of the imaging portion 17 or a result of spectrometry of the spectrometer 18. For example, when the density unevenness correction is to be performed, the adjustment unit 154E specifies a position of density unevenness based on data for image capturing obtained by imaging an adjustment pattern for the density unevenness correction by the imaging portion 17 and acquires a correction value for correcting density unevenness. When the color shift correction is to be performed, the adjustment unit 154E detects a color shift based on spectrometry data obtained by measuring an adjustment pattern such as a color chart by the spectrometer 18 and acquires a correction value for correcting the color shift.

Printer Operation

Next, adjustment processing of a color shift, as an example of an operation of the printer 1 of the first embodiment, will be described based on the accompanying drawings.

Figure 11:
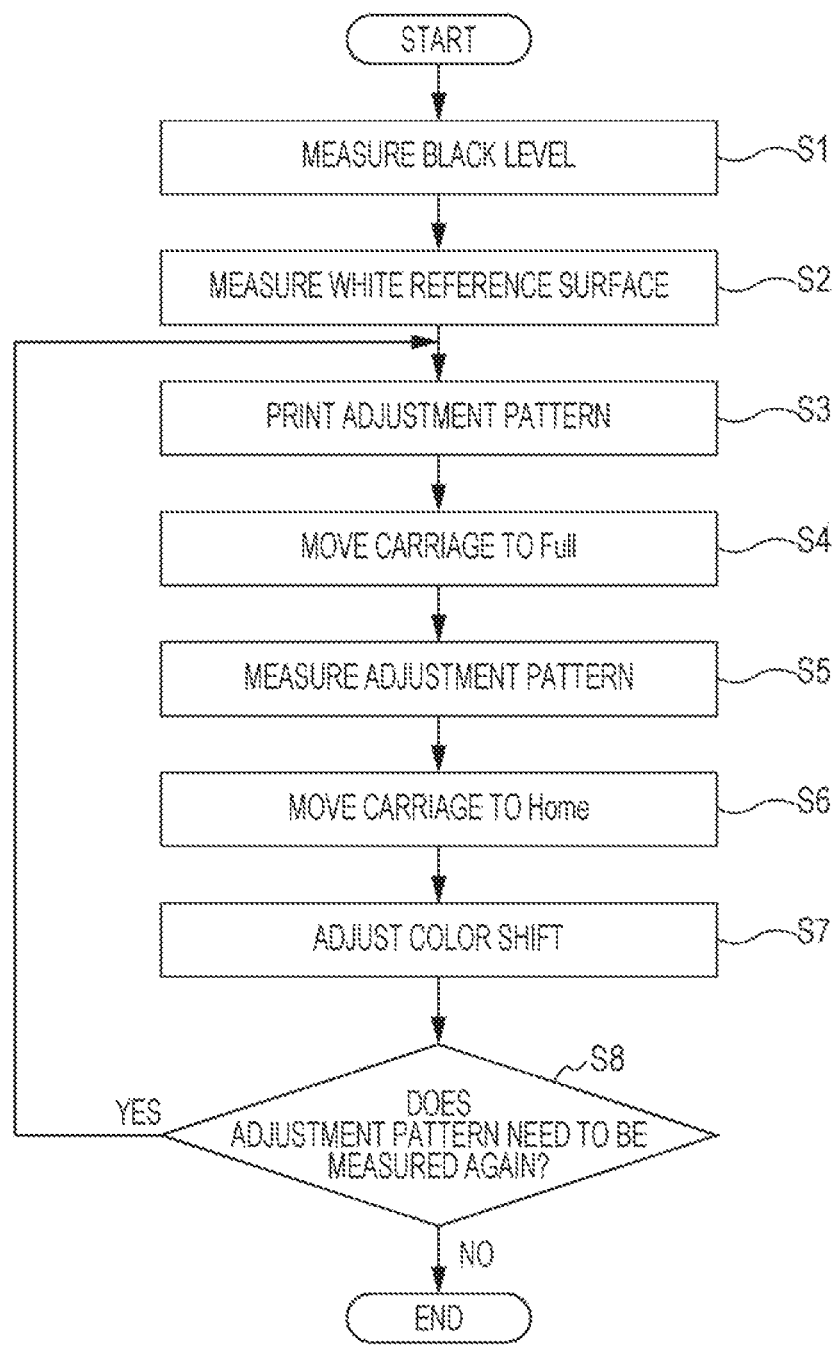
FIG. 11 is a flowchart illustrating an example of processing by the printer of the first embodiment.

FIG. 11 is a flowchart illustrating an example of adjustment processing by the printer 1.

The adjustment processing of the color shift by the printer 1 of the first embodiment is conducted, for example, when power is supplied or when an execution instruction of adjustment processing is received. The printer 1 moves the shutter 191 to the exposed position, for example, when a main measurement such as imaging processing and spectrometry processing for the medium M is intended to be performed and moves the shutter 191 to the blocked position in situations other than the main measurement, for example, during standby or at the time of measuring the white reference surface 191E.

In FIG. 11, although processing for adjusting a color shift based on a result of spectrometry by the spectrometer 18 as adjustment processing is exemplified, an adjustment based on data for image capturing of the imaging portion 17, for example, a density unevenness adjustment may also be performed.

In adjustment processing illustrated in FIG. 11, first, the spectrometry control unit 154D detects an output (that is, dark current) of the light receiving unit 184 and measures a black level while the light source portion 182 of the spectrometer 18 is turned off (Step S1). Simultaneously, the imaging control unit 154C may cause the imaging portion 17 to be driven to measure the black level.

Here, in a situation where an output value from the imaging element 174 or the light receiving unit 184 exceeds a predetermined value, there is a possibility that the opening windows 171A and 181A are not blocked by the shutter 191. Accordingly, in a situation where an output value greater than or equal to the predetermined value is detected in Step S1, the scanning control unit 154A may cause the carriage moving unit 14 to be driven to move the carriage 13 to the home such that the shutter 191 is moved to the blocked position. With this, even though the shutter 191 is moved from the blocked position during standby or when power source is turned off, it is possible to detect the movement of the shutter 191 and move the shutter 191 to the blocked position.

Next, the spectrometry control unit 154D causes the spectrometer 18 to be driven to perform spectrometry of the white reference surface 191E (Step S2). That is, the spectrometry control unit 154D turns the light source portion 182 on to illuminate the white reference surface 191E and acquires a result of spectrometry regarding a plurality of measured wavelengths (a plurality of wavelengths placed at 20 nm intervals in a wavelength region of 400 nm to 700 nm) regarding light reflected from the white reference surface 191E. The imaging control unit 154C may also cause the imaging portion 17 to capture an image of the white reference surface 191E.

Next, the printing control unit 154B performs processing for printing the adjustment pattern for the color shift adjustment on the medium M in a state where the shutter 191 is disposed in the blocked position (Step S3).

The adjustment pattern for the color shift adjustment is, for example, a color chart configured in such a way that a plurality of color patch of which colors are different from each other are disposed in the X-direction and the Y-direction. When a density unevenness adjustment is performed, the printing control unit 154B conducts printing processing for printing the adjustment pattern of density unevenness. In Step S3, the shutter 191 is set in the blocked position and thus, it is possible to suppress ink mist, that has occurred when the printing processing is conducted, from infiltrating into the carriage 13 or from attaching to the imaging portion 17 and the spectrometer 18.

When the printing processing of Step S3 is ended, the scanning control unit 154A moves the carriage 13 to the full and moves the shutter 191 to the exposed position, as illustrated in FIG. 9, in order to perform spectrometry of the adjustment pattern (Step S4).

Thereafter, the spectrometry control unit 154D causes the spectrometer 18 to be driven to perform spectrometry of the adjustment pattern (Step S5). That is, the spectrometry control unit 154D acquires the result of spectrometry regarding each of color patches constituting the adjustment pattern for the color shift adjustment and stores respective positions of color patches within the color chart and the results of spectrometry in the memory 153.

When the spectrometry processing of Step S4 is ended, the scanning control unit 154A moves the carriage 13 to the home and moves the shutter 191 to the blocked position as illustrated in FIG. 8 (Step S6).

Next, the adjustment unit 154E performs a color shift adjustment (Step S7).

The adjustment unit 154E calculates a correction value for adjusting the color shift based on the result of spectrometry of a pattern for adjustment, as needed. For example, in a situation where a level of the color shift exceeds a threshold value, the adjustment unit 154E calculates the correction value for adjusting the color shift based on the result of spectrometry of the pattern for adjustment and performs rewriting of printing profile data or the like stored in the memory 153 or the correction value.

The adjustment unit 154E determines whether the adjustment pattern needs to be measured again or not (Step S8).

For example, in a situation where the level of the color shift exceeds the threshold value, the adjustment unit 154E determines that the adjustment pattern needs to be measured again in order to confirm an adjustment result (YES in Step S8), after the color shift adjustment (Step S7) is performed. When the determination result in Step S8 is YES, the printer 1 conducts processing in and after Step S3.

On the other hand, for example, in a situation where the level of the color shift does not exceed the threshold value and a calculation the correction value or rewriting of the memory 153 is not performed, the adjustment unit 154E determines that the adjustment pattern does not need to be measured (NO in Step S8), the adjustment processing in the flowchart of FIG. 11 is ended.

Effect of First Embodiment

In the first embodiment, the shutter 191 including the imaging portion 17, the spectrometer 18, and the white reference surface 191E is accommodated inside the carriage 13. Among the components described above, the shutter 191 is moved relatively between the exposed position and the blocked position, with respect to the imaging portion 17 and the spectrometer 18, in accordance with the movement of the carriage 13 by the carriage moving unit 14.

According to the configuration as described above, in a situation where the shutter 191 is disposed in the blocked position, respective opening windows 171A and 181A and respective openings 131A and 131B of the carriage 13 are blocked by the shutter 191. For that reason, it is possible to suppress ink mist from attaching to the imaging portion 17 and the spectrometer 18 and suppress the reduction of a function of the imaging portion 17 and the spectrometer 18.

The shutter 191 including the white reference surface 191E is disposed within the carriage 13 and thus, it is possible to suppress the attachment of ink mist with a simple configuration compared to, for example, a case where a configuration in which air flow is generated to thereby suppress ink mist from attaching to the white reference surface 191E is provided. Accordingly, it is possible to suppress the reduction of measurement accuracy the white reference surface 191E by the imaging portion 17 and the spectrometer 18 and suppress the reduction of calibration accuracy of white calibration.

As such, according to the first embodiment, it is possible to suppress the reduction of processing accuracy by the imaging portion 17 and the spectrometer 18.

In the first embodiment, the imaging portion 17 and the spectrometer 18 are disposed in the X-direction. The shutter 191 is disposed in the +Z side of the imaging portion 17 and the spectrometer 18 and is mounted on the carriage 13 to be movable in the X-direction. The shutter 191 includes the first passing-hole 191A which allows the light to be passed to the opening window 171A and the second passing-hole 191B which allows the light to be passed to the opening window 181A when the shutter 191 is disposed in the exposed position. Furthermore, the shutter 191 includes the first reference member 191C which blocks the opening window 171A and the second reference member 191D which blocks the opening window 181A when the shutter 191 is disposed in the blocked position. According to the configuration as described above, it is possible to simultaneously change the relative position of the shutter 191 to respective opening windows 171A and 181A between the exposed position and the blocked position. Accordingly, it is possible to simplify a configuration compared to a case where the relative positions of respective opening windows 171A and 181A and the shutter 191 are individually changed.

In the first embodiment, when the first end portion 194 abuts the first side surface portion 102, the shutter 191 is moved relatively to the +X side with respect to the carriage 13 in accordance with the movement of the carriage 13 to the −X side. With this, the shutter 191 is moved to the blocked position. When the second end portion 195 abuts the second side surface portion 103, the shutter 191 is moved relatively to the −X side with respect to the carriage 13 in accordance with the movement of the carriage 13 to the +X side. With this, the shutter 191 is moved to the exposed position. As such, it is possible to change the position of the shutter 191 between the exposed position and the blocked position without providing a mechanism which moves the shutter 191 relatively with respect to the carriage 13 and simplify the configuration.

The first insertion portion 192 extending from the shutter 191 to the −X side is inserted into the insertion hole 132A and protrudes to the outside of the carriage 13. The first end portion 194 is provided in the −X side of the first insertion portion 192 and abuts the first side surface portion 102 located outside the moving range of the carriage 13. The second insertion portion 193 extending from the shutter 191 to the +X side is inserted into the insertion hole 133A and protrudes to the outside of the carriage 13. The second end portion 195 is provided in the +X side of the second insertion portion 193 and abuts the second side surface portion 103 located outside the moving range of the carriage 13. As such, respective end portions 194 and 195 abut respective side surface portions 102 and 103 located outside the moving range of the carriage 13 to thereby make it possible to suppress operation failure occurring when the carriage 13 is brought into direct contact with respective side surface portions 102 and 103 and improve reliability of the printer 1.

In the first embodiment, the shutter 191 is disposed in the blocked position to thereby make it possible to block respective opening windows 171A and 181A by the white reference surface 191E. Accordingly, it is possible to cause the imaging portion 17 and the spectrometer 18 to measure the white reference surface 191E while respective opening window 171A and 181A are blocked by the shutter 191.

The white reference surface 191E is provided in the shutter 191 moved in the opening window 171A and 181A and thus, it is possible to suppress distance variation between the white reference surface 191E and the optical device and improve measurement accuracy of the white reference surface.

In the first embodiment, when the adjustment of density unevenness, the white reference surface 191E is measured to measure a white level and a black level the color shift, or the like is performed, before the adjustment pattern is printed by the printing unit 16. Here, the relative position of the shutter 191 is set to the blocked position during standby. Accordingly, the white level and the black level is measured to thereby make it possible to efficiently conduct adjustment processing before the shutter 191 is moved to the exposed position, that is, before the carriage 13 is moved to the full.

In the first embodiment, the carriage 13 is moved to the home side at which the maintenance unit 20 is disposed, that is, the −X side such that the shutter 191 is moved to the blocked position. That is, when the carriage is disposed in the maintenance position (home) by the maintenance unit 20, the shutter 191 is moved to the blocked position. According to the configuration as described above, in a situation where the shutter 191 is disposed in the blocked position, it is possible to conduct maintenance of the printing unit 16. It is possible to suppress the occurrence of an erroneous operation such as moving of the shutter 191 to the exposed position during maintenance.

In the first embodiment, the printing unit 16 is located in the home side of the imaging portion 17 and the spectrometer 18 in the carriage 13 and thus, it is possible to provide the maintenance unit 20 in the position of the −X side end portion in the printer 1 and make the size of the printer 1 smaller. That is, in a situation where the printing unit 16 is located in the full side of the imaging portion 17 in the carriage 13, the maintenance unit 20 also needs to be shifted to the full side corresponding to the location of the printing unit 16 and the size of the printer in the X-direction becomes larger. In contrast, in the first embodiment, as described above, the maintenance unit may be provided in the position of the −X side end portion in the unit casing 10 of the printer 1 and the size of the printer 1 can be made smaller.

Second Embodiment

Next, a second embodiment according to the invention will be described.

In the first embodiment described above, when the shutter 191 is disposed in the exposed position, the white reference surface 191E of the shutter 191 is exposed into the carriage 13. In contrast, the second embodiment is different from the first embodiment in that in the second embodiment, when the shutter 191 is disposed in the exposed position, the shutter mechanism 19 includes a cover member which covers the white reference surface 191E.

In the embodiments to be described in the following, same reference numerals are given to configurations described previously and description thereof will be omitted or simplified.

Figure 12:
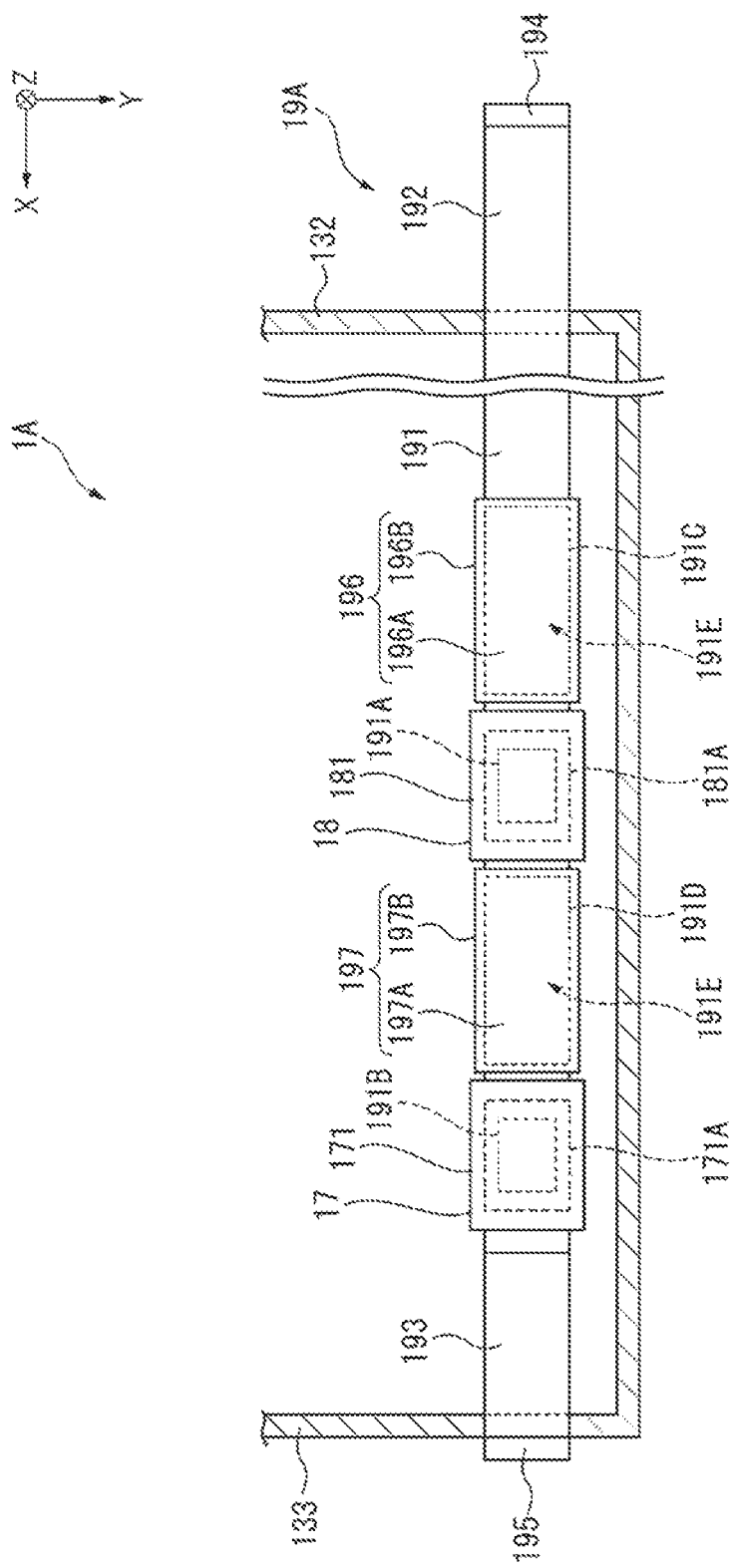
FIG. 12 is a plan view illustrating a schematic configuration of a carriage of a second embodiment.
Figure 13:
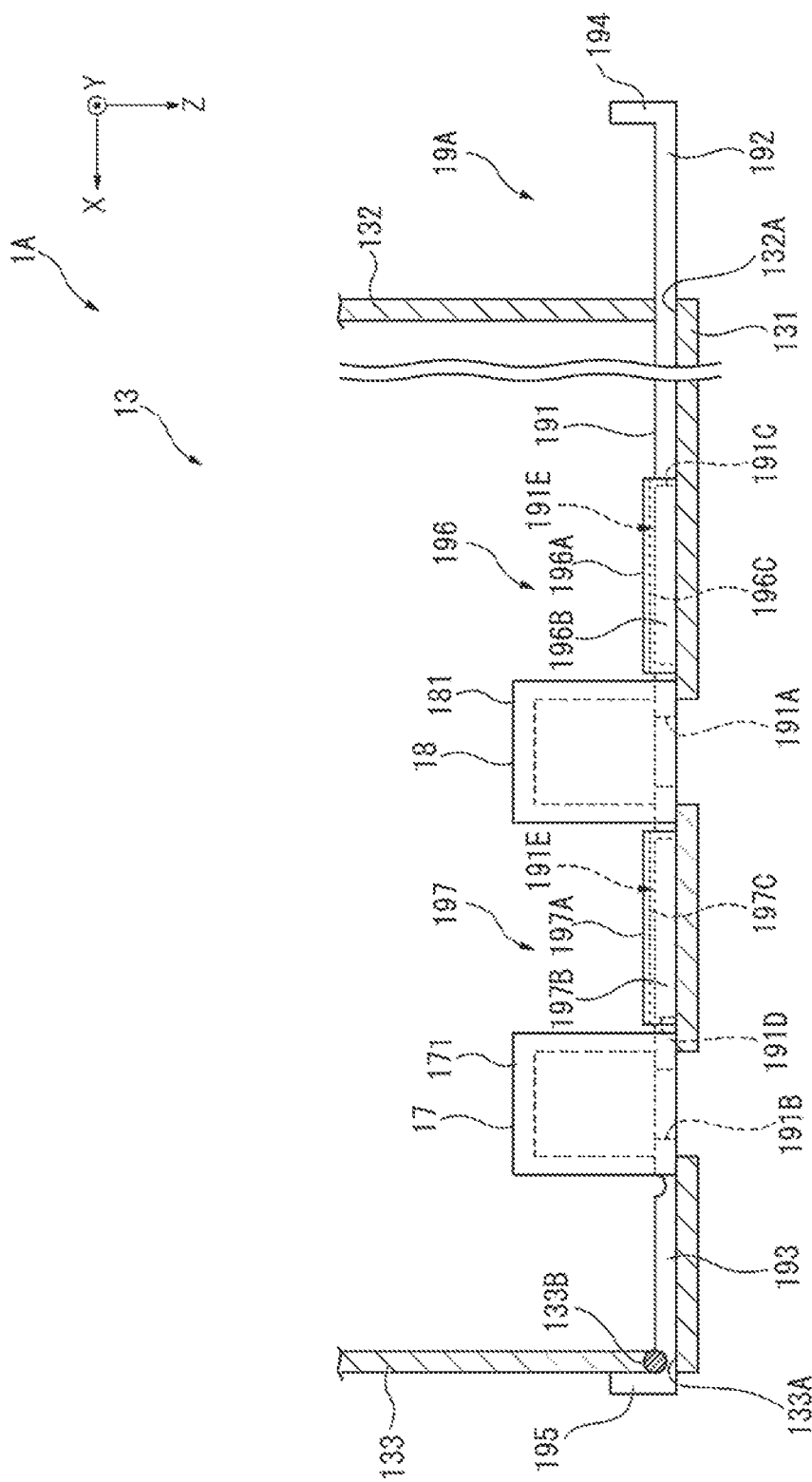
FIG. 13 is a sectional view illustrating another schematic configuration of the carriage of the second embodiment.

FIG. 12 is a diagram schematically illustrating the printing unit 16, the imaging portion 17, and a shutter mechanism 19A accommodated in the carriage 13 of a printer 1A of the second embodiment. FIG. 13 is a sectional view schematically illustrating the carriage 13, the printing unit 16, the imaging portion 17, and the shutter mechanism 19A. In FIG. 12 and FIG. 13, a case where the position of the shutter 191 is the exposed position is illustrated.

Here, the printer 1A of the second embodiment has a configuration which is substantially similar to that of the printer 1 of the first embodiment except for the shutter mechanism 19A.

The shutter mechanism 19A, as illustrated in FIG. 12 and FIG. 13, includes a first cover member 196 for covering the first reference member 191C and a second cover member 197 for covering the second reference member 191D.

In a case where the position of the shutter 191 is the exposed position, the first cover member 196 is provided at a position at which the first reference member 191C may be covered. The first cover member 196 includes a cover portion 196A for covering the white reference surface 191E and a leg portion 196B for fixing the cover portion 196A to the bottom surface 131 of the carriage 13.

The cover portion 196A, as illustrated in FIG. 12, has an appearance which is larger than the white reference surface 191E and is substantially a rectangular shape. The cover portion 196A is fixed to the bottom surface 131 by a pair of leg portions 196B disposed to sandwich the shutter 191 in the Y-direction. A cleaning portion 196C which cleans the white reference surface 191E is provided in the inner surface (surface of +Z side) of the cover portion 196A. The cleaning member is formed by, for example, felt and is brought into slide contact with the white reference surface 191E to clean the white reference surface 191E.

A distance between the one pair of leg portions 196B (Y-direction direction) is substantially the same as or slightly larger than dimension of the shutter 191 in the Y-direction.

In a case where the position of the shutter 191 is the exposed position, the second cover member 197 is able to cover the second reference member 191D. The second cover member 197 includes a cover portion 197A, a leg portion 197B, and a cleaning portion 197C similar to the first cover member 196. The cover portion 197A is disposed in the second reference member 191D in contact with or adjacently to the white reference surface 191E.

Effect of Second Embodiment

In the second embodiment, the first cover member 196 and the second cover member 197 that cover the white reference surface 191E in a situation where the shutter 191 is in the exposed position are included. According to the configuration as described above, the white reference surface 191E is disposed to oppose the opening windows 171A and 181A in the blocked position and is covered by respective cover members 196 and 197 in the exposed position. Accordingly, even when contaminants such as ink mist infiltrate into the carriage 13, it is possible to suppress the contaminants from attaching to the white reference surface 191E.

The leg portion 196B of the first cover member 196 is disposed to sandwich the shutter 191 in the Y-direction. The leg portion 197B of the second cover member 197 is also disposed to sandwich the shutter 191 in the Y-direction. The leg portions 196B and 197B are provided such that it is possible to suppress the positional deviation of the shutter 191 and move the shutter 191 in the X-direction. Accordingly, it is possible to more reliably block respective opening windows 171A and 181A and respective openings 131A and 131B of the carriage 13 by the shutter 191.

Third Embodiment

Next, a third embodiment according to the invention will be described.

In the first embodiment described above, the shutter mechanism 19 is configured such that the shutter 191 is moved to the blocked position in accordance with the movement of the carriage 13 to the home and the shutter 191 is moved to the exposed position in accordance with the movement of the carriage 13 to the full. In contrast, the first embodiment is different from the third embodiment in that in the third embodiment, the shutter mechanism is moved to one direction in the X-direction to change a positional relationship between the shutter 191 and the opening window 171A, that is, a latch mechanism which switches the position of the shutter 191 between the blocked position and the exposed position is included.

Figure 14:
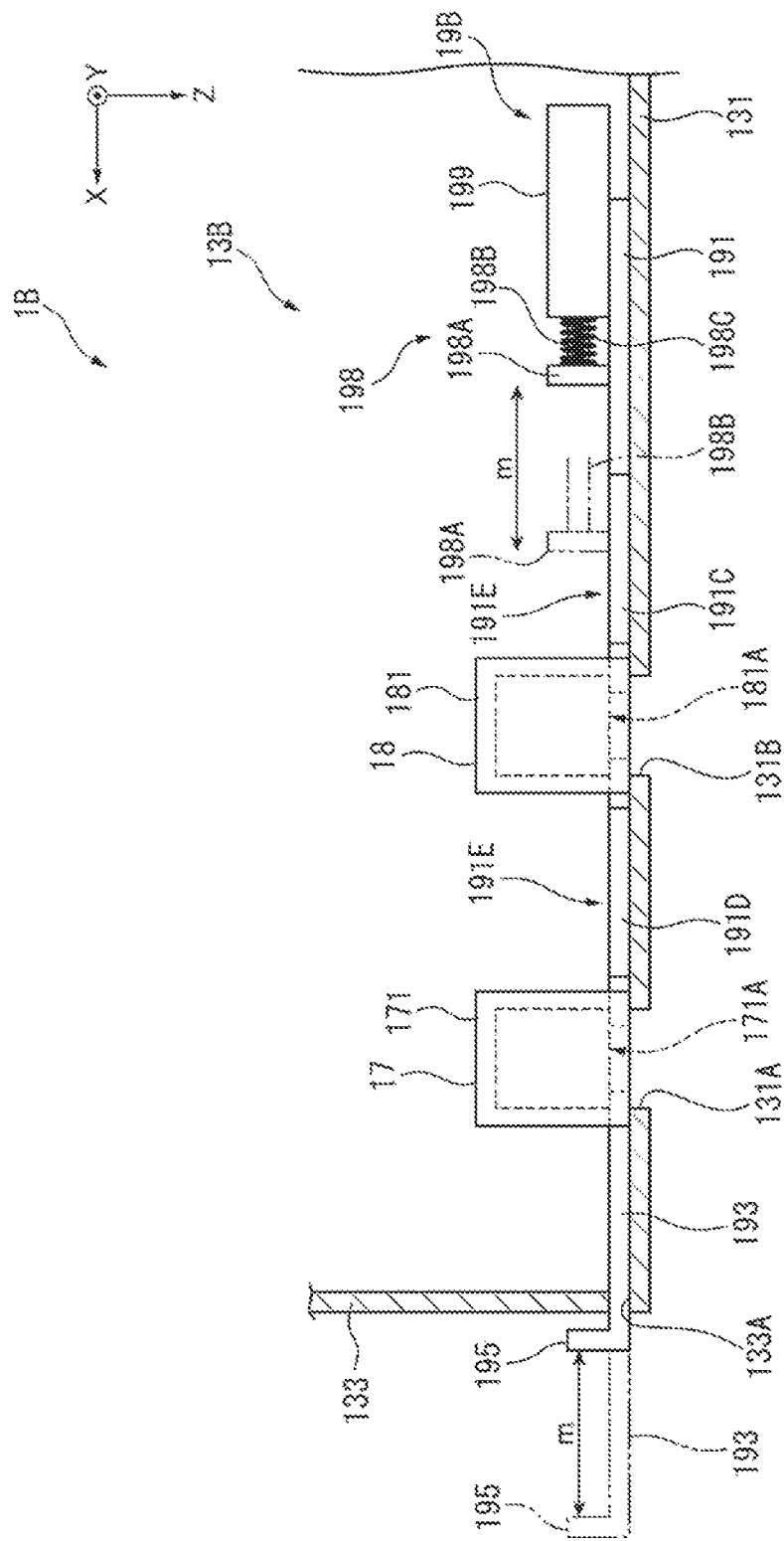
FIG. 14 is a sectional view illustrating a schematic configuration of a carriage of a third embodiment.
Figure 15:
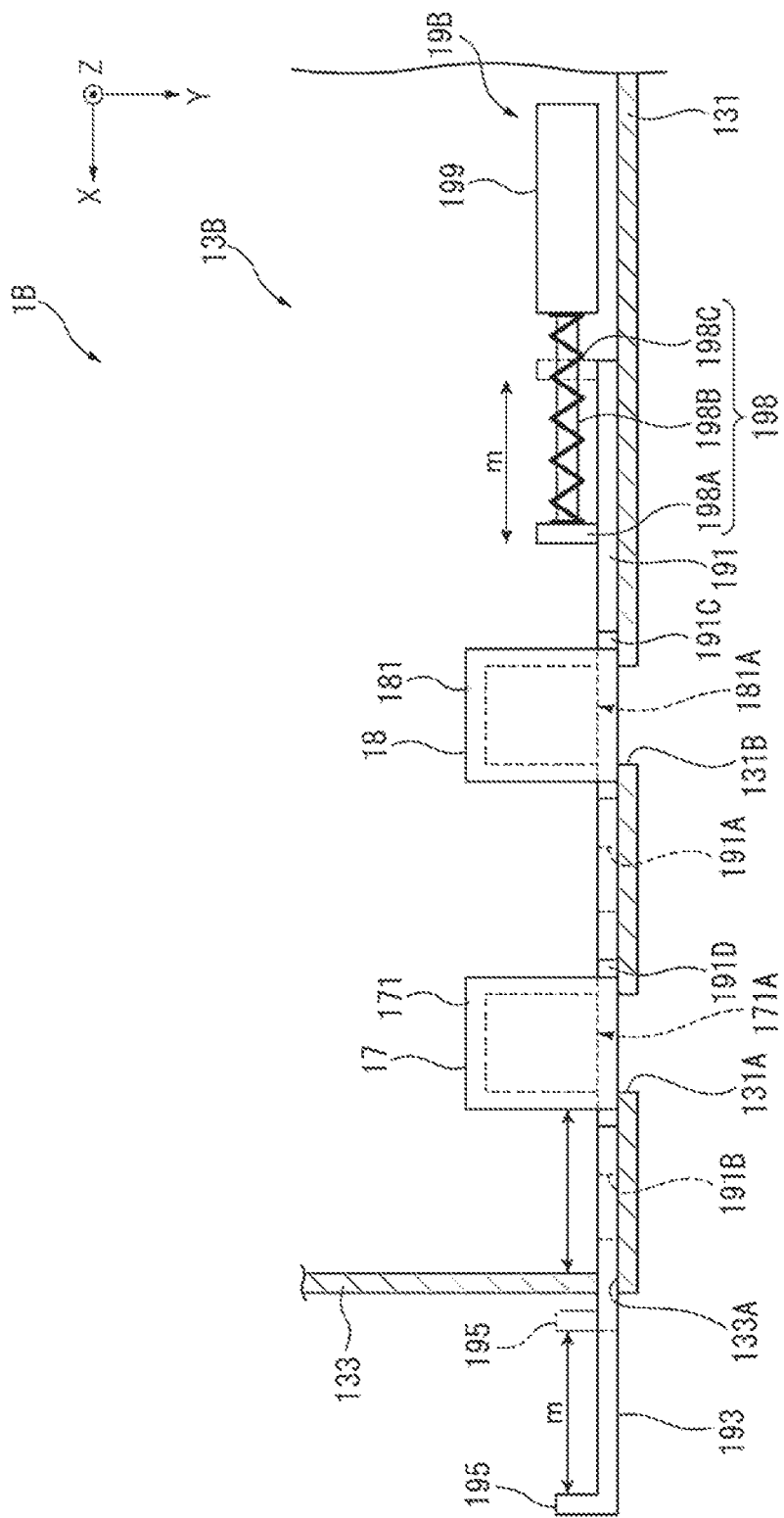
FIG. 15 is a sectional view illustrating another schematic configuration of the carriage of the third embodiment.

FIG. 14 and FIG. 15 are sectional views schematically illustrating a relationship between a carriage 13B, the imaging portion 17, and a shutter mechanism 19B in the printer of the third embodiment. FIG. 14 illustrates a case where the position of the shutter 191 is in the exposed position and FIG. 15 illustrates a case where the position of the shutter 191 is in the blocked position.

A printer 1B of the third embodiment has a configuration which is substantially similar to that of the printer 1 of the first embodiment except for the carriage 13B and the shutter mechanism 19B.

As illustrated in FIG. 14 and FIG. 15, the printing unit 16, the imaging portion 17, and the shutter mechanism 19B are mounted on the carriage 13B. The carriage 13B has a configuration which is substantially similar to the carriage 13 of the first embodiment except that the insertion hole 132A is not formed on the first carriage side surface 132.

The shutter mechanism 19B includes the shutter 191, the second insertion portion 193, the second end portion 195, and an urging portion 198 which urges the shutter 191 to the +X side, a latch mechanism 199 which fixes the position of the shutter 191 to the exposed position.

In the shutter mechanism 19B, the second end portion 195 abuts on the second side surface portion 103 and each time when the second insertion portion 193 is pushed into the −X side, a lock state and a lock release state are switched by the latch mechanism 199. The position of the shutter 191 is changed between the exposed position corresponding to the lock state and the blocked position corresponding to the lock release state.

The urging portion 198 is connected to the −X side of the shutter 191 and urges the shutter 191 to the +X side. The urging portion 198 includes a connection portion 198A connected to the shutter 191, a shaft portion 198B protruding in the X-direction from the −X side of the connection portion 198A, and an urging member 198C which urges the connection portion 198A to the +X side.

The shaft portion 198B is disposed in the X-direction, the +X side of the shaft portion 198B is attached to the connection portion 198A to be rotatable about the X-axis, and the −X side is connected to the latch mechanism 199. That is, the connection portion 198A and the latch mechanism 199 are connected through the shaft portion 198B.

The urging member 198C is configured with, for example, a spring, is wound around the shaft portion 198B, urges the connection portion 198A to the +X side, and urges the shutter 191 to the +X side. When a state is changed from the lock state (see FIG. 14) to the lock release state (see FIG. 15), the connection portion 198A is moved to the +X side by an urging force of the urging member 198C. In this case, an amount of movement of the connection portion 198A corresponds to the amount of movement m of the shutter 191.

The latch mechanism 199 corresponds to a latch portion and switches the positions of the connection portion 198A and the shaft portion 198B between a lock position (see FIG. 14) corresponding to the lock state and a lock release position (see FIG. 15) corresponding to the lock release state each time when the second end portion 195 is pushed to the −X side.

In the lock state illustrated in FIG. 14, the latch mechanism 199 holds the connection portion 198A and the shaft portion 198B in the lock position against an urging force by the urging member 198C and holds the shutter 191 in the exposed position.

On the other hand, in the lock release state illustrated in FIG. 15, the latch mechanism 199 moves the connection portion 198A and the shaft portion 198B to the lock release position according to the urging force by the urging member 198C and the shutter 191 is moved to the exposed position.

The latch mechanism 199 is configured to include, for example, a latch cam and a rotor. The latch cam is configured to include a plurality of recessed portions and a plurality of projected portions provided in the X-direction of the inner circumferential surface of the casing of the latch mechanism 199. The recessed portion and the projected portion are alternately provided in the circumferential direction of the inner circumferential surface. The rotor includes a protruding portion engageable with the recessed portion. The +X side of the rotor is connected to the shaft portion 198B. The rotor is configured in such a way that the rotor and the shaft portion 198B rotate around the X-axis when the rotor is moved to the −X side by the latch cam. At the position where the protruding portion of the rotor is engaged with the recessed portion of the latch cam when the rotor is moved in the X-direction, the protruding portion of the rotor becomes in a state capable of being moved to the +X side along the recessed portion. In this state, the shutter 191 may be moved to the +X side by the urging force of the urging member 198C and thus, the shutter 191 goes to the lock release state described above. In the lock release state, as described above, the connection portion 198A and the shaft portion 198B are moved to the +X side and the position of the shutter 191 becomes the blocked position.

Next, when the second end portion 195 is pushed to the −X side from a state where the shutter 191 is in the blocked position, the shaft portion 198B is also moved to the −X side and the protruding portion of the rotor is moved to the −X side along the recessed portion of the latch cam. When the protruding portion of the rotor is moved closer to the −X side compared to the recessed portion, the shaft portion 198B and the rotor rotates and the protruding portion of the rotor is located at a position where the protruding portion of the rotor abuts on the projected portion of the latch cam when the rotor is moved in the X-direction. In this state, even when pushing on the second end portion 195 to the −X side is released and the shutter 191 is moved to the +X side by the urging force of the urging member 198C, the protruding portion of the rotor abuts on the projected portion of the latch cam to become a lock state. With this, the connection portion 198A and the shaft portion 198B are fixed in the −X side of the latch cam. That is, the position of the shutter 191 is fixed to the exposed position. The latch mechanism 199 may be configured to be able to change the position of the shutter 191 between the exposed position and the blocked position each time when the second end portion 195 is pushed to the −X side, and a configuration of the latch mechanism 199 is not limited to the configuration described above.

The printer 1B configured as described above moves the carriage 13B to the full, that is, the +X side by the carriage moving unit 14 in a situation where the shutter 191 is intended to be moved. The second end portion 195 abuts on the second side surface portion 103 in accordance with the movement of the carriage 13B and the second end portion 195 is pushed into the carriage 13. With this, the shaft portion 198B is pushed into the latch mechanism 199 and the position of the shutter 191 is switched between the blocked position corresponding to the lock state and the exposed position corresponding to the lock release state of the latch mechanism 199.

Effect of Third Embodiment

In the third embodiment, the carriage 13B is moved to the +X side and the second end portion 195 abuts the second side surface portion 103 to thereby switch the latch mechanism 199 between the lock state and the lock release state. With this, it is possible to switch the position of the shutter 191 between the exposed position corresponding to the lock state and the blocked position corresponding to the lock release state. Accordingly, in a situation where the shutter 191 is intended to be moved, the carriage 13B may be moved to the +X side, and it is possible to simplify opening and closing processing of the shutter 191.

In the third embodiment, when the carriage 13B is moved to the full side opposite to the home side at which the maintenance unit 20 is disposed, opening and closing of the shutter 191 is performed. For that reason, it is possible to suppress the occurrence of an erroneous operation such as moving of the shutter 191 to the exposed position when the carriage 13B is moved to the home side during maintenance.

Modification Example

The invention is not limited to the first to third embodiments described above and intends to include alterations and modifications to the embodiments in a scope for achieving aspects of the invention.

In the first to third embodiments described above, the shutter mechanism 19 having a configuration in which the first end portion 194 protruding to the −X side and the second end portion 195 protruding to the +X side are provided as the protruding portion protruding to the outside of the carriage 13 and the first end portion 194 and the second end portion 195 are enabled to abut each other to thereby relatively move the shutter 191 is exemplified, the configuration of the shutter mechanism 19 is not limited thereto.

For example, the protruding portion may protrude to the outside of the carriage 13 in the Z-direction. Specifically, the protruding portion which is a protruding portion which passes through a slit formed on the bottom surface 131 of the carriage 13 and protrudes to the +Z side of the carriage 13 may be included. In this case, the abutting portion which enables the protruding portion to be abutted may be provided at the platen 122 side. The protruding portion may protrude to the outside of the carriage 13 in the Y-direction.

In the first to third embodiments described above, although a configuration in which the first end portion 194 and the second end portion 195 are included as two protruding portions is exemplified, the number of protruding portions may be one and otherwise, greater than or equal to three. In this case, an abutting portion may be provided within the unit casing 10 as the abutting portion, in addition to the inner surface of the unit casing 10.

In the first to third embodiments described above, a second moving mechanism having a configuration in which the protruding portion which protrudes to the outside of the carriage 13 in accordance with the movement of the carriage 13 by the carriage moving unit 14 is allowed to be abutted onto the abutting portion to thereby relatively move the shutter 191 is exemplified, a configuration of the second moving mechanism is not limited thereto. For example, an arbitrary mechanism which does not include a protruding portion and relatively moves the shutter 191 according to a position or an amount of movement of the carriage 13 may be used as the second moving mechanism. For example, the second moving mechanism may be configured in such a way that a driving device such as an actuator or a motor which moves the shutter 191 in the X-direction is included and the shutter 191 may be moved between the blocked position and the exposed position in accordance with the movement of the carriage 13.

In the first to third embodiments described above, although the maintenance unit 20 is disposed at the home side, the maintenance unit 20 may be disposed at the full side. The maintenance unit 20 may not also be provided.

In the first and second embodiments, a configuration in which the carriage 13 is moved to the home side such that the shutter 191 goes to the blocked position is exemplified, but the invention is not limited thereto, and another configuration in which the carriage 13 is moved to the full side such that the shutter 191 goes to the blocked position may be adopted. In this case, the maintenance unit 20 is preferably disposed at the full side. With this, the shutter 191 may be set to the blocked position during maintenance and an erroneous operation of the shutter 191 may be suppressed.

In third embodiment, although a configuration in which the carriage 13 is moved to the full side to thereby change the position of the shutter 191 is exemplified, another configuration in which the carriage 13 is moved to the home side to thereby change the position of the shutter 191 may be adopted.

In the first and second embodiments, a configuration in which the amount of movement m of the shutter 191, that is, an amount of pushing m of the first insertion portion 192 and the second insertion portion 193 corresponds to a disposition interval between the first passing-hole 191A and the first reference member 191C is exemplified, but the invention is not limited thereto. A pushing amount m with which the respective opening windows 171A and 181A may be exposed and blocked by the shutter 191 may be available.

A configuration in which three or more passing holes and a reference member are provided in the shutter 191 and the blocked position and the exposed position are able to be changed according to the amount of movement while the shutter 191 is moved in one direction with respect to the carriage 13 may be adopted. That is, a plurality of passing holes are provided in the shutter 191 at a predetermined interval in the Y-direction and similarly, a plurality of white reference surfaces may be provided in the shutter 191. The predetermined interval corresponds to disposition interval between the imaging portion 17 and the spectrometer 18. In the configuration described above, it is possible to set the position of the shutter 191 to any of a plurality of exposed positions and a plurality of blocked positions according to the amount of pushing m of the first insertion portion 192 and the second insertion portion 193.

In the first and the second embodiment, although the amount of pushing m is controlled depending on a position where the first end portion 194 abuts the first carriage side surface 132 and a position where the second end portion 195 abuts the second carriage side surface 133, in a situation where three or more passing holes and a reference member are provided in the shutter 191, the amount of pushing m is controlled by detecting an amount of movement of the carriage by a linear sensor or the like to thereby make it possible to change the blocked position and the exposed position according to the amount of movement while the shutter 191 is moved in one direction. In the configuration described above, as in the first and the second embodiments, when the shutter is moved from the blocked position to the exposed position, the carriage 13 does not need to be moved to the full, and the carriage 13 is moved to the vicinity of the home and the full so as to make it possible to expose and block the respective opening windows 171A and 181A. Accordingly, it is possible to reduce the amount of movement of the carriage and required time when opening and closing of the respective opening windows 171A and 181A are performed by the shutter 191.

In the first to third embodiments described above, although a configuration in which a white reference member is provided in a portion of the shutter 191 is exemplified, the invention is not limited thereto and the entire surface of the shutter 191 may be white and otherwise, the entirety of a surface of the −Z side may be white. That is, in the first to third embodiments, a portion located at a position corresponding to the position of the white reference surface 191E may be formed in at least white.

In the first to third embodiments described above, although a configuration in which the imaging portion 17 and the spectrometer 18 are included as an example of the optical device is exemplified, the invention is not limited thereto and another configuration in which another optical device, which performs processing based on incident light, may be adopted. As the optical device described above, an optical sensor or the like for detecting a distance to the medium M and the tip of the medium M may be included.

The position of the imaging portion 17 with respect to the printing unit 16 is not limited to the full side of the printing unit 16 in the carriage 13. For example, the imaging portion 17 may be disposed at the home side of the printing unit 16.

Although the imaging portion 17 and the spectrometer 18 are provided closer to the +Y side compared to the printing unit 16 in the carriage 13, the imaging portion 17 and the spectrometer 18 may be provided at the −Y side of the printing unit 16.

A configuration in which separately from the carriage for printing in which the printing unit 16 is provided, a carriage for measurement on which the imaging portion 17 and the spectrometer 18 are mounted is included and the carriage for measurement may be moved by using a moving mechanism having a configuration similar to that of the carriage moving unit 14 may be adopted.

Although a configuration in which the medium M is transported in the Y-direction by the supply unit 11 and the transport unit 12 so as to relatively move the carriage 13 in the Y-direction with respect to the medium M is exemplified, the invention is not limited thereto. For example, the carriage 13 may be configured to be movable in the Y-direction. The carriage 13 may be configured to be movable in both the X-direction and the Y-direction.

Furthermore, although a configuration in which the carriage moving unit 14 moves the carriage 13 in the X-direction is exemplified, another configuration in which the medium M is moved in the X-direction may be adopted.

In the first to third embodiments described above, although a configuration in which the carriage 13 is included and the imaging portion 17, the spectrometer 18, and the shutter 191 are accommodated inside the carriage 13 is exemplified, the invention is not limited thereto. For example, another configuration in which the imaging portion 17, the spectrometer 18, and the shutter 191 may be disposed in a base portion, for example, the bottom surface 131 of the carriage 13 without being accommodated inside the carriage 13 may be adopted. Also, in such a configuration, it is possible to suppress the reduction of performance of the imaging portion 17 and the spectrometer 18 or the contamination of the white reference surface 191E due to ink mist by setting the shutter 191 to be located at the blocked position at the time of ejecting inks.

In the first to third embodiments described above, although a configuration in which as a printer, a so-called ink jet printer including the printing unit 16 which ejects inks to form an image is exemplified, the invention is not limited thereto and the configurations of the first to third embodiments may be applied to a printer including a printing unit which transfers an image formation material onto the medium M to form an image. Such a printer may include, for example, a so-called heat transfer printer in which an ink ribbon, as an image formation material, is heated and melted to be transferred onto the medium M and a so-called electrophotographic printer in which a latent image is developed using toner and the developed image is transferred onto the medium M. As such, even in a situation where the configurations of the first to third embodiments described above are applied to other type printers other than the ink jet type printer, it is possible to suitably suppress degradation or contamination of the optical device due to scattered image formation materials.

In the first to third embodiments described above, although the printer 1 including the measuring device is exemplified, the invention is not limited thereto but may include, for example, a measuring device which does not include the printing unit 16 and performs only measurement of the medium M. The measuring device according to the invention may be incorporated into, for example, a quality inspection device which performs quality inspection of a printed matter manufactured at a factory or the like and additionally, the measuring device according to the invention may be incorporated into any device.

Furthermore, a specific structure when embodying the invention may be appropriately changed to other structures or the like within a range capable of achieving an advantage of some aspects of the invention.

The entire disclosure of Japanese Patent Application No. 2016-101359, filed May 20, 2016 is expressly incorporated by reference herein.

What is claimed is:

1. A measuring device comprising:
a plurality of optical devices, each of the plurality of optical devices including a window on which light is incident;
a shutter which includes a plurality of white reference surfaces, the plurality of white reference surfaces being provided on an optical device side of the shutter, the optical device side facing the plurality of optical devices, the plurality of white reference surfaces corresponding to the plurality of optical devices, the shutter being configured to block the window of each of the plurality of optical devices;
a first moving mechanism which moves the plurality of optical devices in a direction; and
a second moving mechanism which relatively moves the window of each of the plurality of optical devices and the shutter between a first position at which the plurality of windows are blocked by the plurality of white reference surfaces and a second position at which light is incident on the window of each of the plurality of optical devices,
wherein the second moving mechanism simultaneously changes relative positions of the plurality of the white reference surfaces and the plurality of optical devices corresponding thereto between the first position and the second position.

2. The measuring device according to claim 1, further comprising:
a cover which covers the plurality of white reference surfaces when the shutter is in the second position.

3. A printing apparatus comprising:
the measuring device according to claim 2; and
a printing unit which prints an image onto a medium.

4. The printing device according to claim 3, further comprising:
a maintenance member which conducts maintenance of the printing unit when the plurality of optical devices are moved to a maintenance position,
wherein the second moving mechanism changes the relative positions of the plurality of windows and the shutter to the first position when the plurality of optical devices are moved to the maintenance position by the first moving mechanism.

5. The measuring device according to claim 1, further comprising:
a casing in which the plurality of optical devices are provided and which includes a plurality of openings at positions opposing the plurality of windows,
wherein the shutter is disposed within the casing, and
the first moving mechanism moves the plurality of optical devices by moving the casing, and
the second moving mechanism which relatively moves the plurality of windows and the shutter between the first position and the second position in accordance with movement of the casing by the first moving mechanism.

6. The measuring device according to claim 5,
wherein the second moving mechanism includes:
a protrusion which is connected to the shutter and protrudes beyond the casing; and
an abutting member onto which the protrusion abuts in accordance with movement of the casing by the first moving mechanism, and
wherein the shutter is moved relatively when the first moving mechanism moves the casing while the protrusion abuts the abutting member.

7. The measuring device according to claim 6,
wherein the protrusion protrudes from the casing in one direction.

8. A printing apparatus comprising:
the measuring device according to claim 7; and
a printing unit which prints an image onto a medium.

9. A printing apparatus comprising:
the measuring device according to claim 6; and
a printing unit which prints an image onto a medium.

10. The measuring device according to claim 5,
wherein the second moving mechanism includes:
a protrusion which is connected to the shutter and protrudes beyond the casing;
an abutting member onto which the protrusion abuts in accordance with movement of the casing by the first moving mechanism;
an urging member which urges the shutter in one direction; and
a latch which fixes the shutter at a fixing position, and
wherein when the casing is moved by the first moving mechanism so that the protrusion abuts the abutting member, and the latch selectively fixes and releases the shutter to and from the fixing position so that the shutter is moved relatively between the first position and the second position.

11. A printing apparatus comprising:
the measuring device according to claim 10; and
a printing unit which prints an image onto a medium.

12. A printing apparatus comprising:
the measuring device according to claim 5; and
a printing unit which prints an image onto a medium.

13. The measuring device according to claim 1, further comprising:
a movement controller which is configured to move the plurality of optical devices by the first moving mechanism so as to change relative positions of the plurality of windows and the shutter between the first position and the second position; and
a measurement controller which is configured to cause the plurality of optical devices to perform main measurement so that a measurement target is measured,
wherein the movement controller changes the relative position to the second position when the main measurement is performed, and the measurement controller changes the relative position to the first position when the main measurement is not performed.

14. A printing apparatus comprising:
the measuring device according to claim 13; and
a printing unit which prints an image onto a medium.

15. A printing apparatus comprising:
the measuring device according to claim 1; and
a printing unit which prints an image onto a medium.

16. The printing device according to claim 15, further comprising:
a maintenance member which conducts maintenance of the printing unit when the plurality of optical devices are moved to a maintenance position,
wherein the second moving mechanism changes the relative positions of the plurality of windows and the shutter to the first position when the plurality of optical devices are moved to the maintenance position by the first moving mechanism.

17. The printing device according to claim 15, further comprising:
a movement controller which is configured to move the plurality of optical devices by the first moving mechanism so as to change the relative positions of the plurality of windows and the shutter between the first position and the second position; and a printing controller which is configured to cause the printing unit to print the image, wherein the printing controller is configured to cause the printing unit to print the image after the relative positions are changed to the first position by the movement controller.

18. A measuring device comprising:

an optical device which includes a window on which light is incident;

a shutter which includes a white reference surface on an optical device side of the shutter and is configured to block the window;

a first moving mechanism which moves the optical device in a direction;

a second moving mechanism which relatively moves the window and the shutter between a first position at which the window is blocked by the white reference surface and a second position at which light is incident on the window; and a casing in which the optical device is provided and which includes an opening at a position opposing the window, wherein the shutter is disposed within the casing, the first moving mechanism moves the optical device by moving the casing, the second moving mechanism which relatively moves the window and the shutter between the first position and the second position in accordance with movement of the casing by the first moving mechanism, wherein the second moving mechanism includes:

a protrusion which is connected to the shutter and protrudes beyond the casing;

an abutting member onto which the protrusion abuts in accordance with movement of the casing by the first moving mechanism;

an urging member which urges the shutter in one direction; and a latch which fixes the shutter at a fixing position, and wherein when the casing is moved by the first moving mechanism so that the protrusion abuts the abutting member, and the latch selectively fixes and releases the shutter to and from the fixing position so that the shutter is moved relatively between the first position and the second position.

19. A printing apparatus comprising:

the measuring device according to claim 18; and a printing unit which prints an image onto a medium.

* * * * *